United States Patent
Kawasaki et al.

(10) Patent No.: US 10,214,656 B2
(45) Date of Patent: Feb. 26, 2019

(54) COPPER NANOPARTICLES AND PRODUCTION METHOD FOR SAME, COPPER NANOPARTICLE FLUID DISPERSION, COPPER NANOINK, COPPER NANOPARTICLE PRESERVATION METHOD, AND COPPER NANOPARTICLE SINTERING METHOD

(71) Applicant: A SCHOOL CORPORATION KANSAI UNIVERSITY, Suita-shi, Osaka (JP)

(72) Inventors: Hideya Kawasaki, Suita (JP); Ryuichi Arakawa, Suita (JP); Yuki Hokita, Suita (JP)

(73) Assignee: A SCHOOL CORPORATION KANSAI UNIVERSITY, Osaka (JP)

( * ) Notice: Subject to any disclaimer, the term of this patent is extended or adjusted under 35 U.S.C. 154(b) by 107 days.

(21) Appl. No.: 15/120,978

(22) PCT Filed: Feb. 12, 2015

(86) PCT No.: PCT/JP2015/053833
§ 371 (c)(1),
(2) Date: Aug. 23, 2016

(87) PCT Pub. No.: WO2015/129466
PCT Pub. Date: Sep. 3, 2015

(65) Prior Publication Data
US 2017/0073538 A1 Mar. 16, 2017

(30) Foreign Application Priority Data
Feb. 27, 2014 (JP) .................. 2014-037204

(51) Int. Cl.
*B32B 5/16* (2006.01)
*C09D 11/52* (2014.01)
(Continued)

(52) U.S. Cl.
CPC ............ *C09D 11/52* (2013.01); *B22F 1/0018* (2013.01); *B22F 1/0062* (2013.01);
(Continued)

(58) Field of Classification Search
None
See application file for complete search history.

(56) References Cited

U.S. PATENT DOCUMENTS 6,613,809 B2 * 9/2003 Satcher, Jr. ............... C08G 4/00
521/153
2009/0029148 A1 * 1/2009 Hashimoto .......... B01J 13/0043
428/323

(Continued)

FOREIGN PATENT DOCUMENTS

CN 102199381 A 9/2011
JP 2007-84879 A 4/2007

(Continued)

OTHER PUBLICATIONS

Translation of JP 2011-032558 (published Feb. 17, 2011) from J-Plat Pat.*

(Continued)

*Primary Examiner* — George Wyszomierski
(74) *Attorney, Agent, or Firm* — Westerman, Hattori, Daniels & Adrian, LLP

(57) ABSTRACT

An object of the present invention is to provide copper nanoparticles that suppress the oxidation of copper, have an average particle diameter of 10 nm or less and therefore undergo a remarkable reduction in the melting point, are highly dispersible, can be sintered at a low temperature, allow the removal of the protective layer during low-temperature sintering at 150° C. or less, and can be suitably used as a conductive copper nanoink material; and to also provide a method for preserving copper nanoparticles, (Continued)

whereby the copper nanoparticles can be stably preserved at room temperature for a long period of time, and can be transported.

The present invention provides copper nanoparticles each having a central portion comprising a copper single crystal, and a protective layer surrounding the central portion;

(1) the copper nanoparticles having an average particle diameter of 10 nm or less;
(2) the protective layer containing at least one member selected from the group consisting of $C_{3-6}$ primary alcohols, $C_{3-6}$ secondary alcohols, and derivatives thereof; and
(3) the protective layer having a boiling point or thermal decomposition point of 150° C. or less.

14 Claims, 9 Drawing Sheets

(51) Int. Cl.
    *B32B 27/14* (2006.01)
    *B22F 9/24* (2006.01)
    *B82Y 30/00* (2011.01)
    *B22F 1/00* (2006.01)
    *C09C 1/62* (2006.01)
    *C09D 11/00* (2014.01)
    *C09D 17/00* (2006.01)
    *B82Y 40/00* (2011.01)

(52) U.S. Cl.
    CPC .............. *B22F 1/0074* (2013.01); *B22F 9/24* (2013.01); *B32B 5/16* (2013.01); *B32B 27/14* (2013.01); *B82Y 30/00* (2013.01); *C09C 1/627* (2013.01); *C09D 11/00* (2013.01); *C09D 17/006* (2013.01); *B82Y 40/00* (2013.01)

(56) References Cited

U.S. PATENT DOCUMENTS

| | | |
|---|---|---|
| 2011/0042447 A1 | 2/2011 | Komatsu |
| 2011/0236709 A1 | 9/2011 | Jablonski et al. |
| 2013/0098205 A1 | 4/2013 | Komatsu |
| 2013/0164187 A1 | 6/2013 | Komatsu |
| 2014/0120359 A2 | 5/2014 | Jablonski et al. |
| 2016/0368048 A1* | 12/2016 | De La Vega .............. B22F 9/24 |

FOREIGN PATENT DOCUMENTS

| | | | |
|---|---|---|---|
| JP | 2007-197756 A | | 8/2007 |
| JP | 2007-321216 A | | 12/2007 |
| JP | 2008-300046 A | | 12/2008 |
| JP | 2009-227736 A | | 10/2009 |
| JP | 2011032558 A | * | 2/2011 |
| JP | 2013-7076 A | | 1/2013 |
| WO | 2009/090748 A1 | | 7/2009 |
| WO | 2009/090767 A1 | | 7/2009 |
| WO | 2012/147945 A1 | | 11/2012 |
| WO | 2013/035366 A1 | | 3/2013 |
| WO | 2013/128449 A2 | | 9/2013 |

OTHER PUBLICATIONS

Translation of JP 2014-224276 (published Nov. 4, 2014) from J-Plat Pat.*
Office Action dated Apr. 25, 2017, issued in counterpart Chinese Application No. 2015800106102, with English machine translation. (19 pages).
Carroll et al., "Preparation of Elemental Cu and Ni Nanoparticles by the Polyol Method: An Experimental and Theoretical Approach", J. Phys. Chem. C 2011, vol. 115, No. 6, pp. 2656-2664, (cited in the specification).
Carroll et al., "Selective Nucleation and Growth of Cu and Ni Core/Shell Nanoparticles", Chem. Matter 2010, vol. 22, No. 7, pp. 2175-2177, (cited in the specification).
Venkata et al., "RSC Advances—Copper Conductive Inks: Synthesis and its Utilization in Flexible Electronics", Royal Society of Chemistry, 2015, pp. 1-73.
International Search Report dated May 12, 2015, issued in counterpart International Application No. PCT/JP2015/053833 (2 pages).
Office Action dated Nov. 20, 2017, issued in counterpart Korean Application No. 10-2016-7022649, with English machine translation. (11 pages).

* cited by examiner

COPPER NANOPARTICLES AND PRODUCTION METHOD FOR SAME, COPPER NANOPARTICLE FLUID DISPERSION, COPPER NANOINK, COPPER NANOPARTICLE PRESERVATION METHOD, AND COPPER NANOPARTICLE SINTERING METHOD

TECHNICAL FIELD

The present invention relates to copper nanoparticles that can be sintered at a low temperature, a method for producing the copper nanoparticles, a copper nanoparticle dispersion, and copper nanoink; and also relates to a method for preserving monodisperse nano-sized copper nanoparticles having high dispersion stability, and a method for sintering the copper nanoparticles.

BACKGROUND ART

Metal nanoparticles of about 2 nm to 100 nm in diameter have characteristics different from those of bulk metal, in terms of optical properties, magnetic properties, heat properties, electrical properties, etc. Therefore, such nanoparticles are expected to be applied in various technical fields. For example, taking advantage of the properties that a smaller particle size has a larger surface area and induces a reduction in the melting point, research on the production of electronic circuits comprising a fine metal wire on substrates using fine-wire printing ink containing metal nanoparticles has proceeded.

The fine-wire printing ink uses, as an ink material, a dispersion containing metal nanoparticles, whose surface is protected by an organic substance, and a circuit pattern is printed on a substrate by using a fine-wire printing technique, and heated at a low temperature to thereby remove the organic substance from the surface of the metal nanoparticles, and to form metal bonds between the metal nanoparticles. In particular, when metal nanoparticles having a diameter of 10 nm or less are used, the melting point is significantly reduced. Thus, a fine metal wire having high thermal conductivity and electrical conductivity can be formed.

Silver nanoparticles are mainly used as a fine-wire printing ink material (see PTL 1). However, when the silver nanoparticles disclosed in PTL 1 are used, the so-called "migration phenomenon" is likely to occur. Specifically, silver in the fine wire is oxidized and thereby ionized, and moves on the insulating material of the substrate, thereby inducing a short circuit. Further, use of gold has also been examined. Gold is preferable because it is less likely to induce the migration phenomenon; however, there is the problem that it is expensive.

Accordingly, as the metal used as a fine-wire printing ink material, copper has attracted attention because it is less likely than silver to induce the migration phenomenon and its cost is relatively low.

Bulk copper, which is conventionally used as metal wire, has drawbacks in that, for example, it is easily oxidized, thereby reducing conductivity, and has a high sintering temperature. In contrast, copper nanoparticles have a lower sintering temperature than bulk copper, and are expected to be a material that can form fine metal wire on a substrate vulnerable to heat, such as paper or plastic.

However, copper nanoparticles are aggregated more easily than other metal nanoparticles, such as gold and silver, and the aggregate has a particle diameter of several tens of nm to several hundreds of nm; therefore, it is difficult to synthesize monodisperse copper nanoparticles having an average particle diameter of 10 nm or less, which are particularly useful as an ink material. For example, NPL 1 teaches that crystalline copper nanoparticles having a particle size of around 50 nm are obtained by refluxing a copper component in an ethylene glycol solvent for 2 hours. Further, NPL 2 teaches that copper-nickel composite particles having a particle size of several hundreds of nm are obtained by rapidly heating a solution in which a copper compound, a nickel compound, and a base are dissolved in ethylene glycol to the boiling point using a heater. In particular, NPL 2 teaches that copper nanoparticles having a particle size of several hundreds of nm are obtained at a boiling point of around 165° C. in a state in which hydrated water of a copper compound and a nickel compound is contained.

Copper nanoparticles having an average particle diameter of 10 nm or less that undergo a remarkable reduction in the melting point are desired as a nanoink material that can form a fine metal wire on a substrate vulnerable to heat, such as paper or plastic; however, there have been no copper nanoparticles that can be sintered at a low temperature within such a temperature region. This is because copper nanoparticles having an average particle diameter of 10 nm or less are highly reactive and thus unstable, and the oxidation and aggregation of the copper nanoparticles easily occur. It is difficult to stably preserve such copper nanoparticles even immediately after the copper nanoparticles are obtained. Therefore, microscopic copper nanoparticles having an average particle diameter of 10 nm are produced using, as a protective agent, a polymer or the like that strongly binds to the copper surface. However, there is a problem that the protective agent cannot be completely removed during low-temperature heating, leading to a reduction in the electrical conductivity of the fine metal wire.

As a method for producing copper nanoparticles having a small average particle diameter, PTL 2 discloses a method for producing metal nanoparticles by reacting a reducing agent with a solution containing an organic acid metal salt and an amine compound. Further, PTL 3 discloses a method for producing copper nanoparticles by reacting a reducing agent with a solution comprising an organic acid copper salt and $C_{8-16}$ monoamine. PTL 2 discloses a method for producing copper nanoparticles of about 5 nm, and PTL 3 discloses a method for producing copper nanoparticles having an average particle diameter of 10 nm or less and having a uniform particle size distribution.

However, it is difficult to decompose and remove the amines having 8 or more carbon atoms shown in PTL 2 and PTL 3 during low-temperature heating. For example, the organic amine protective layer on the surface of the copper nanoparticles cannot be removed at 150° C. or less. In PTL 2 and PTL 3, copper nanoparticles with an organic amine protective layer having 8 or more carbon atoms were actually produced. It is not disclosed that the copper nanoparticles can be sintered at a low temperature of 150° C. or less, and that the amine protective layer of the copper nanoparticles can be removed. Thus, there is demand for a protective layer comprising a short-chain amine that allows the removal of the amine protective layer from the surface of the copper nanoparticles even by low-temperature sintering at 150° C. or less. However, such a short-chain amine has low protective power, thus causing problems that the coarsening, aggregation, and oxidation of the copper nanoparticles are likely to occur, and that stable copper nanoparticles having an average particle diameter of 6 nm or less cannot be obtained.

Copper nanoparticles having an average particle diameter of 10 nm or less have a large surface area and are easily oxidized; however, PTL 2 and PTL 3 merely disclose copper nanoparticles having an average particle diameter of 10 nm or less, which is observed with an electron microscope. Further, PTL 2 and PTL 3 do not provide any data showing that the obtained copper nanoparticles are not oxidized.

Moreover, PTL 4 discloses a method for storing a nanoparticle dispersion, the method comprising storing, at 10° C. or less, a nanoparticle dispersion in which copper nanoparticles or copper oxide nanoparticles each coated with a protective agent are dispersed in a solvent. Paragraph [0015] of PTL 4 states that the coating amount of the protective agent is 30 parts by mass or more and 150 parts by mass or less based on 100 parts by mass of each copper nanoparticle or copper oxide nanoparticle. However, in terms of simplicity and the convenience of transport, there is demand for a method that can preserve and transport copper nanoparticles at room temperature (10° C. or more), and that can preserve them for a long period of time.

From the above viewpoint, copper nanoparticles used as a conductive copper ink material that can be sintered at a low temperature are required to satisfy the following requirements:

(1) they are highly dispersible copper nanoparticles having an average particle diameter of 10 nm or less that undergo a remarkable reduction in the melting point;

(2) the protective layer of the copper nanoparticles can be removed during low-temperature sintering at 150° C. or less; and (3) the oxidation of the copper nanoparticles is suppressed.

In addition, in terms of production scale-up and low cost for industrialization, the copper nanoparticles are required to satisfy the following requirement:

(4) the copper nanoparticles can be stably preserved at room temperature for a long period of time, and can be transported.

However, at present, copper nanoparticles, copper nanoparticle dispersion, copper nanoink, and methods for preserving copper nanoparticles do not satisfies these requirements.

CITATION LIST

Patent Literature

PTL 1: JP2009-227736A
PTL 2: JP2007-321216A
PTL 3: JP2007-84879A
PTL 4: JP2007-197756A

Non-Patent Literature

NPL 1: J Phys Chem C, Vol. 115, No. 6, pp. 2656-2664 (Feb. 17, 2011)
NPL 2: Chem Mater, Vol. 22, No. 7, pp. 2175-2177 (Apr. 13, 2010)

SUMMARY OF INVENTION

Technical Problem

An object of the present invention is to provide copper nanoparticles that suppress the oxidation of copper, have an average particle diameter of 10 nm or less and therefore undergo a remarkable reduction in the melting point, are highly dispersible, can be sintered at a low temperature, allow the removal of the protective layer during low-temperature sintering at 150° C. or less, and can be suitably used as a conductive copper nanoink material; and to also provide a copper nanoparticle dispersion in which the copper nanoparticles are dispersed, and copper nanoink comprising the copper nanoparticle dispersion.

Another object of the present invention is to provide a method for preserving copper nanoparticles, whereby the copper nanoparticles can be stably preserved at room temperature for a long period of time, and can be transported.

Still another object of the present invention is to provide a method for sintering the copper nanoparticles.

Solution to Problem

The present inventors conducted extensive research and consequently found that the above objects can be achieved by copper nanoparticles each having a central portion comprising a copper single crystal, and a protective layer surrounding the central portion; the copper nanoparticles having a specific average particle diameter, and the protective layer containing at least one member selected from the group consisting of $C_{3-6}$ primary alcohols, $C_{3-6}$ secondary alcohols, and derivatives thereof. Thus, the present invention has been completed.

More specifically, the present invention relates to the following copper nanoparticles, copper nanoparticle dispersion, copper nanoink, method for preserving copper nanoparticles, and method for sintering copper nanoparticles.

1. Copper nanoparticles each having a central portion comprising a copper single crystal, and a protective layer surrounding the central portion;

(1) the copper nanoparticles having an average particle diameter of 10 nm or less;

(2) the protective layer containing at least one member selected from the group consisting of $C_{3-6}$ primary alcohols, $C_{3-6}$ secondary alcohols, and derivatives thereof; and (3) the protective layer having a boiling point or thermal decomposition point of 150° C. or less.

2. The copper nanoparticles according to item 1, wherein the standard deviation based on particle size distribution is 20% or less of the average particle diameter of the copper nanoparticles.

3. The copper nanoparticles according to item 1 or 2, wherein the mass ratio of the protective layer in each copper nanoparticle is 10 to 30 mass % based on 100 mass % of the copper nanoparticle.

4. The copper nanoparticles according to any one of items 1 to 3, wherein the at least one member selected from the group consisting of $C_{3-6}$ primary alcohols, $C_{3-6}$ secondary alcohols, and derivatives thereof has a group represented by the following formula (1) or (2):

(1)

(2)

wherein in formulas (1) and (2), the asterisk (*) represents a bonding hand.

5. A method for preserving the copper nanoparticles according to any one of items 1 to 4, the method comprising:
  (1) step 1 of precipitating the copper nanoparticles dispersed in a solution; and
  (2) step 2 of adding a $C_{4-14}$ alkane solvent to the solution in which the copper nanoparticles are precipitated.

6. The preservation method according to item 5, wherein the preservation temperature is 10° C. or more.

7. A copper nanoparticle dispersion in which the copper nanoparticles according to any one of items 1 to 4 are dispersed in a dispersion medium.

8. A copper nanoparticle dispersion in which the copper nanoparticles according to any one of items 1 to 4 and copper particles are dispersed in a dispersion medium.

9. The copper nanoparticle dispersion according to item 8, wherein the copper particles have an average particle diameter of 1 to 200 μm.

10. The copper nanoparticle dispersion according to item 8 or 9, wherein the ratio of the mass of the copper nanoparticles (Ma) to the total (Ma+Mb) of the mass of the copper nanoparticles (Ma) and the mass of the copper particles (Mb) is 2 mass % or more.

11. Copper nanoink comprising the copper nanoparticle dispersion according to any one of items 7 to 10.

12. A method for sintering the copper nanoparticles according to any one of items 1 to 4, the method comprising sintering the copper nanoparticles in a non-reducing atmosphere under ordinary pressure or reduced pressure at a temperature of 150° C. or less.

13. A method for producing copper nanoparticles each having a central portion comprising a copper single crystal, and a protective layer surrounding the central portion, the method comprising:
  (I) step I of preparing a solution in which copper acetate and at least one member selected from the group consisting of $C_{3-6}$ primary alcohols, $C_{3-6}$ secondary alcohols, and derivatives thereof are dissolved in a $C_2$-4 diol; and
  (II) step II of reducing the solution with hydrazine under atmospheric pressure at 100° C. or less;
  wherein the copper nanoparticles have an average particle diameter of 10 nm or less, and the protective layer has a boiling point or thermal decomposition point of 150° C. or less.

Advantageous Effects of Invention

The copper nanoparticles of the present invention have an average particle diameter of 10 nm or less; therefore, they undergo a remarkable reduction in the melting point, have a low sintering temperature, and can form a fine metal wire on a substrate vulnerable to heat, such as paper or plastic. Moreover, in the copper nanoparticles of the present invention, the central portion comprising a copper single crystal is covered with a protective layer containing at least one member selected from the group consisting of $C_{3-6}$ primary alcohols, $C_{3-6}$ secondary alcohols, and derivatives thereof. Accordingly, the aggregation of the copper nanoparticles is suppressed, and the oxidation of copper is also suppressed. Further, since the protective layer contains at least one member selected from the group consisting of $C_{3-6}$ primary alcohols, $C_{3-6}$ secondary alcohols, and derivatives thereof, the protective layer is decomposed or evaporated at a low temperature; therefore, the protective layer can be removed when the copper nanoparticles are sintered at a low temperature of 150° C. or less. Accordingly, the copper nanoparticles of the present invention can be preferably used as an ink material.

Moreover, in the copper nanoparticles of the present invention, at least one member selected from the group consisting of $C_{3-6}$ primary alcohols, $C_{3-6}$ secondary alcohols, and derivatives thereof, which forms the protective layer, is volatile; therefore, in low-temperature sintering under reduced pressure, the copper nanoparticles can be sintered at a temperature of about 80° C. to form a copper thin film, although such low-temperature sintering has not been achieved so far. Thus, it is also possible to form a fine metal wire at a lower temperature. Accordingly, a copper nanoparticle dispersion in which the copper nanoparticles of the present invention are dispersed, and copper nanoink comprising the copper nanoparticle dispersion can be preferably used to form a fine metal wire.

Furthermore, according to the method for preserving the copper nanoparticles of the present invention, in step 1, the copper nanoparticles are precipitated in the bottom of the solution, thereby keeping the copper nanoparticles away from the liquid surface of the solution; and in step 2, a $C_{4-14}$ alkane solvent is added to the solution, and the alkane solvent, which has a lower specific gravity, comes to the surface to cover the liquid surface of the solution. Thus, the contact between the copper nanoparticles and oxygen can be prevented. In addition, according to the above preservation method, the copper nanoparticles can be stably preserved at room temperature by using an alkane solvent that is stable even at room temperature of 10° C. or more.

DESCRIPTION OF EMBODIMENTS

Figure 1:
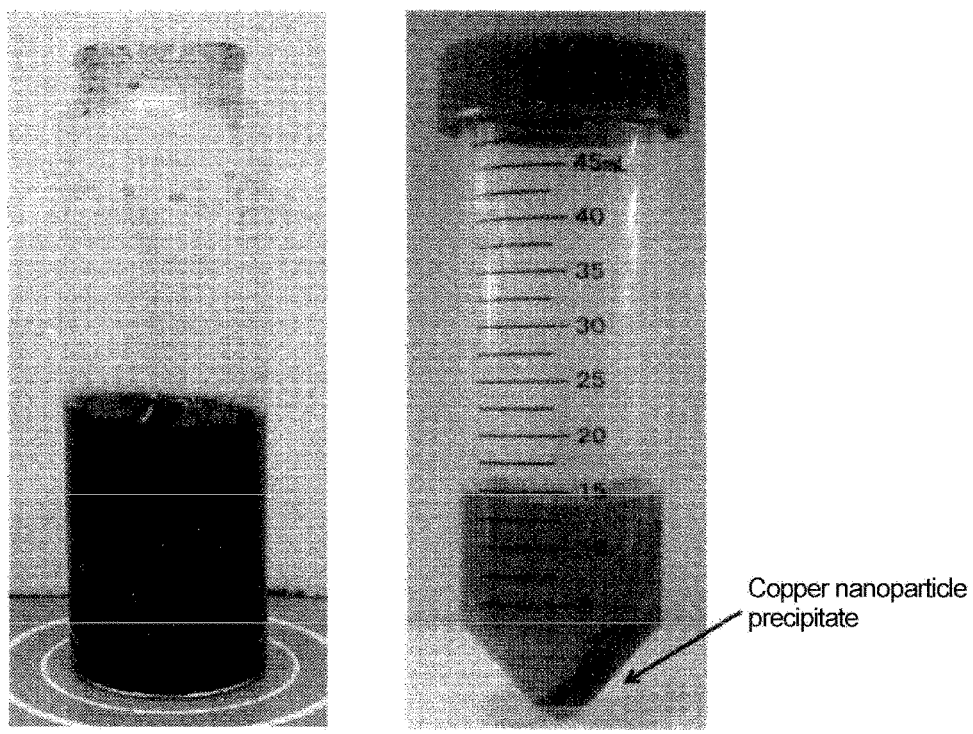
FIG. 1 shows photographs of a solution in which copper nanoparticles obtained in Example 1 are dispersed (image on left), and of the solution after precipitation and separation (image on right).

The present invention is described in detail below.

The copper nanoparticles of the present invention each have a central portion comprising a copper single crystal, and a protective layer surrounding the central portion;

(1) the copper nanoparticles having an average particle diameter of 10 nm or less;

(2) the protective layer containing at least one member selected from the group consisting of $C_{3-6}$ primary alcohols, $C_{3-6}$ secondary alcohols, and derivatives thereof (hereinafter also referred to as "$C_{3-6}$ primary and/or secondary alcohols, etc."); and (3) the protective layer having a boiling point or thermal decomposition point of 150° C. or less.

The copper nanoparticles of the present invention, which have the above characteristics, have an average particle diameter of 10 nm or less; therefore, they undergo a significant reduction in the melting point, have a low sintering temperature, and can form a fine metal wire on a substrate vulnerable to heat, such as paper or plastic. Moreover, in the copper nanoparticles of the present invention, the central portion comprising a copper single crystal is coated with a protective layer containing $C_{3-6}$ primary and/or secondary alcohols, etc. Accordingly, the aggregation of the copper nanoparticles is suppressed, and the oxidation of copper is also suppressed. Further, since the protective layer contains $C_{3-6}$ primary and/or secondary alcohols, etc., and the boiling point or thermal decomposition point of the protective layer is 150° C. or less, the protective layer is decomposed or evaporated at a low temperature. Therefore, when the copper nanoparticles are sintered at a low temperature of 150° C. or less, the protective layer can also be removed. Accordingly, the copper nanoparticles of the present invention can be suitably used as an ink material. Moreover, in the copper nanoparticles of the present invention, the $C_{3-6}$ primary and/or secondary alcohols, etc., which form the protective layer, are volatile; therefore, in low-temperature sintering under reduced pressure, the copper nanoparticles can be sintered at a temperature of about 80° C. to form a copper thin film, although such low-temperature sintering has not been achieved so far. It is also possible to form a fine metal wire at a lower temperature. Therefore, a copper nanoparticle dispersion in which the copper nanoparticles are dispersed, and copper nanoink comprising the copper nanoparticle dispersion can be suitably used to form a fine metal wire.

Furthermore, the method for preserving the copper nanoparticles of the present invention comprises:

(1) step 1 of precipitating the copper nanoparticles dispersed in a solution; and (2) step 2 of adding a $C_{4-14}$ alkane solvent to the solution in which the copper nanoparticles are precipitated.

According to the method for preserving the copper nanoparticles of the present invention, which have the above characteristics, the copper nanoparticles are precipitated in the bottom of the solution in step 1, thereby keeping the copper nanoparticles away from the liquid surface of the solution, and a $C_{4-14}$ alkane solvent is added to the solution in step 2, thereby coating the liquid surface of the solution with the alkane solvent, which comes to the surface because of its low specific gravity, so that the contact between the copper nanoparticles and oxygen can be suppressed. Moreover, according to the above preservation method, the copper nanoparticles can be stably preserved at room temperature by using an alkane solvent, which is stable even at room temperature of 10° C. or more.

1. Copper Nanoparticles

The copper nanoparticles of the present invention each have a central portion comprising a copper single crystal, and a protective layer surrounding the central portion.

The copper that forms the central portion of the copper nanoparticles of the present invention is a single crystal. The term "single crystal" as mentioned in the present invention means that any portion of the crystal has the same crystal orientation, and that the atoms constituting it are spatially regularly arranged. That is, this term means that in the copper single crystal forming the central portion of each of the copper nanoparticles of the present invention, the entire particle is one crystal, no crystals growing in various directions are mixed therein, and the copper particles are not aggregated, etc. This can be confirmed by the peak measurement of the copper nanoparticles by XRD analysis, and by direct observation of atomic arrangement using a high-resolution electron microscope.

The copper nanoparticles of the present invention each have a protective layer formed around the central portion comprising a copper single crystal. The protective layer contains at least one member selected from the group consisting of $C_{3-6}$ primary alcohols, $C_{3-6}$ secondary alcohols, and derivatives thereof.

Examples of the $C_{3-6}$ secondary alcohols and derivatives thereof include $C_{3-6}$ secondary alcohols, and compounds in which an amino group, a carboxyl group, a hydroxyl group, etc., is added to $C_{3-6}$ secondary alcohols. Specific examples include 1-amino-2-propanol, 2-hydroxybutyric acid, 3-hydroxybutyric acid, 1,2-propanediol, 1,2-butanediol, 1,3-butanediol, and 2,3-butanediol. These secondary alcohols, etc., may be used singly or as a mixture thereof.

The hydroxyl group of the secondary alcohol has high affinity with the solvent and the copper surface, and contributes to the improvement of dispersibility. Because the hydroxyl group of the secondary alcohol has reducing ability, the oxidation of copper is suppressed. Further, because the oxide produced during low-temperature sintering is a ketone compound, it is easily vaporized and decomposed.

The $C_{3-6}$ secondary alcohols and derivatives thereof are preferably monoalcohols. The use of monoalcohols makes it easy to adjust the boiling point or thermal decomposition point of the protective layer to 150° C. or less.

The $C_{3-6}$ secondary alcohols and derivatives thereof preferably have a group represented by the following formula (1). In the following formulas (1) to (5), the asterisk (*) represents a bonding hand.

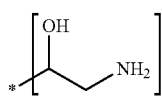

(1)

The group represented by formula (1) is oxidized to a ketone, and produces a group represented by the following formula (3).

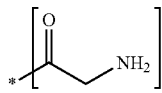

(3)

The groups represented by formulas (1) and (3) above have high coordination power, and each forms a 5-membered ring together with the copper atom on the surface of the central portion comprising a copper single crystal to become a group having a metallacycle structure represented by the following formula (4) or (5), which is stabilized. Accordingly, the aggregation of the copper nanoparticles is more suppressed.

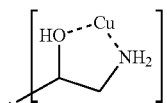

(4)

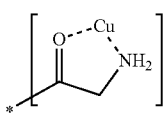

(5)

Examples of the $C_{3-6}$ primary alcohols and derivatives thereof include $C_{3-6}$ primary alcohols, and compounds in which an amino group, a carboxyl group, a hydroxyl group, etc., is added to $C_{3-6}$ primary alcohols. Specific examples include 2-amino-2-ethyl-, 3-propanediol and 2-amino-1-butanol. These primary alcohols, etc., may be used singly or as a mixture thereof.

The $C_{3-6}$ primary alcohols and derivatives thereof are preferably monoalcohols. The use of monoalcohols makes it easy to adjust the boiling point or thermal decomposition point of the protective layer to 150° C. or less.

The $C_{3-6}$ primary alcohols and derivatives thereof preferably have a group represented by the following formula (2).

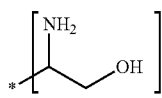

(2)

The group represented by formula (2) also forms a 5-membered ring together with the copper atom on the surface of the central portion comprising a copper single crystal to become a group having a metallacycle structure, which is stabilized. Accordingly, the aggregation of the copper nanoparticles is more suppressed.

Among the above $C_{3-6}$ primary and/or secondary alcohols, etc., 1-amino-2-propanol is preferred. 1-amino-2-propanol satisfies the following conditions, which are preferable for a protective agent for copper nanoparticles that can be sintered at a low temperature. The conditions are as follows: it can increase the dispersibility of the copper nanoparticles, suppress the oxidation of the copper nanoparticles, and is decomposed or vaporized (evaporated) at a low temperature of 150° C. or less while suppressing the oxidation of copper in the process of sintering during the production. Therefore, the boiling point or thermal decomposition point of the protective layer is 150° C. or less. The thermal decomposition point of the protective layer mentioned here refers to a temperature at which the substance that constitutes the protective layer is desorbed by heat from the central portion comprising a copper single crystal. Desorption of the substance mentioned here includes a case in which the substance constituting the protective layer is evaporated by heat. When copper nanoparticles are produced using 1-amino-2-propanol mentioned above, the amino group in the structure coordinates with copper ions to form a complex, and the hydroxyl group increases the solubility in $C_{2-4}$ diols, such as ethylene glycol. Consequently, monodisperse copper nanoparticles having an average particle diameter of 6 nm or less can be synthesized, in spite of the high copper ion concentration (e.g., 1,000 mM in terms of copper ions). Further, the hydroxyl group of 1-amino-2-propanol improves oxidation resistance, and due to the volatility of 1-amino-2-propanol, it can be removed by decomposition and evaporation by heating at a low temperature of 150° C. or less, and can suppress the oxidation of copper due to low-temperature heating. For example, taking advantage of the volatility of 1-amino-2-propanol, the protective layer comprising 1-amino-2-propanol can be removed at 80° C. (under reduced pressure), which has not been achieved so far, and the copper nanoparticles can be sintered at a low temperature. When the protective layer comprises octylamine, etc., which is used as a general amine for the synthesis of copper nanoparticles, the produced copper nanoparticles are aggregated during the production to form bulk copper, thereby failing to obtain copper nanoparticles.

The boiling point or thermal decomposition point of the protective layer of the copper nanoparticles can be measured by conducting thermal analysis by TG-DTA in a nitrogen atmosphere by using a dry powder of the copper nanoparticles.

The protective layer may contain components other than at least one member selected from the group consisting of $C_{3-6}$ primary alcohols, $C_{3-6}$ secondary alcohols, and derivatives thereof mentioned above; however, it is preferable that the protective layer consists of at least one member selected from the group consisting of $C_{3-6}$ primary alcohols, $C_{3-6}$ secondary alcohols, and derivatives thereof, in terms of facilitating low-temperature sintering of the copper nanoparticles.

The mass ratio of the protective layer in each copper nanoparticle is preferably 10 to 30 mass % based on 100 mass % of the copper nanoparticle. If the mass ratio of the protective layer is too high, the protective layer may not be sufficiently removed even by heating at a low temperature of 150° C. or less during sintering of the copper nanoparticles. If the mass ratio of the protective layer is too low, the copper single crystal may not be sufficiently protected.

The copper nanoparticles of the present invention have an average particle diameter of 10 nm or less. If the average particle diameter of the copper nanoparticles exceeds 10 nm, the copper nanoparticles cannot be sintered at a low temperature. The average particle diameter is preferably 3 to 8 nm, and more preferably 3 to 6 nm. If the average particle diameter of the copper nanoparticles is smaller than 3 nm, the copper nanoparticles may be aggregated.

The average particle diameter in the present specification is an arithmetic mean value of the particle diameter of 100 randomly selected particles in a TEM observation image.

In the copper nanoparticles of the present invention, the standard deviation based on particle size distribution is preferably 20% or less of the average particle diameter of the copper nanoparticles. That is, it is preferable that the value obtained by dividing the standard deviation based on particle size distribution of the copper nanoparticles by the average particle diameter of the copper nanoparticles, and expressing the resulting value as a percentage, be 20% or less. Due to the standard deviation based on particle size distribution of the copper nanoparticles within the above range, the average particle diameter of copper nanoparticles is uniformized, and the resulting copper nanoparticles are suitable for sintering at a low temperature.

Method for Producing Copper Nanoparticles

The method for producing the copper nanoparticles of the present invention is not particularly limited. The copper nanoparticles of the present invention can be produced by a conventionally known method.

An example of the method for producing the copper nanoparticles of the present invention is as follows:

a method for producing copper nanoparticles each having a central portion comprising a copper single crystal, and a protective layer surrounding the central portion, the method comprising:

(I) step I of preparing a solution in which copper acetate and at least one member selected from the group consisting of $C_{3-6}$ primary alcohols, $C_{3-6}$ secondary alcohols, and derivatives thereof are dissolved in a $C_{2-4}$ diol; and (II) step II of reducing the solution with hydrazine under atmospheric pressure at 100° C. or less;

wherein the copper nanoparticles have an average particle diameter of 10 nm or less, and the protective layer has a boiling point or thermal decomposition point of 150° C. or less. This production method is illustratively described below.

Step I is to prepare a solution in which copper acetate and at least one member selected from the group consisting of $C_{3-6}$ primary alcohols, $C_{3-6}$ secondary alcohols, and derivatives thereof are dissolved in a $C_{2-4}$ diol.

The copper compound used in step I is copper acetate [Cu(acac)$_2$]. In consideration of use as a conductive material, the copper compound used in step I is preferably copper ions that are dissolved in a $C_{2-4}$ diol and do not contain halogen. If copper acetate is used as the copper compound used in step I, copper ions are easily reduced, and highly dispersible copper nanoparticles having an average particle diameter of 10 nm or less, particularly 3 to 6 nm, are easily obtained. In contrast, for example, when copper formate [Cu(HCOO)$_2$] is used as the copper compound used ins step I, aggregation is promoted by formic acid, which is a strong acid ion, and aggregates of coarse copper particle are formed.

In step I, the content of copper acetate in the solution is not particularly limited; however, the amount in terms of copper ions is preferably about 5 to 1,000 mM, more preferably about 100 to 400 mM, and even more preferably about 200 to 300 mM. If the copper acetate content of the solution is too low, copper nanoparticles may be difficult to obtain. If the copper acetate content of the solution is too high, the copper nanoparticles produced may be aggregated, and bulk copper may be precipitated.

In step I, at least one member selected from the group consisting of $C_{3-6}$ primary and/or secondary alcohols, and derivatives thereof is used. Due to the use of such $C_{3-6}$ primary and/or secondary alcohols, etc., a protective layer comprising the $C_{3-6}$ primary and/or secondary alcohols, etc., can be formed around the central portion comprising a copper single crystal. The protective layer can be decomposed or vaporized (evaporated) at a low temperature of 150° C. or less, as described above.

Usable $C_{3-6}$ primary and/or secondary alcohols, etc., are the same as those mentioned above for forming the protective layer of the copper nanoparticles.

In step I, the concentration of the $C_{3-6}$ primary and/or secondary alcohols, etc., in the solution is preferably 3 to 20 times, more preferably 3 to 10 times, higher than the concentration of copper ions in the solution. If the concentration of the $C_{3-6}$ primary and/or secondary alcohols, etc., in the solution is too low, the protective layer may not be sufficiently formed. Further, the resulting copper nanoparticles may have a large average particle diameter. If the concentration of the $C_{3-6}$ primary and/or secondary alcohols, etc., in the solution is too high, the presence of excessive secondary alcohols, etc., may make it difficult to separate and purify copper nanoparticles.

In step I, a $C_{2-4}$ diol is used as the solvent for preparing the solution. When a $C_{2-4}$ diol is used as the solvent, copper acetate and $C_{3-6}$ primary and/or secondary alcohols, etc., can be dissolved, and the aggregation and oxidation of copper nanoparticles to be obtained can be suppressed. Examples of the $C_{2-4}$ diol include ethylene glycol and propylene glycol. Among these, ethylene glycol is preferred in terms of the excellent dispersibility of copper nanoparticles to be obtained.

The $C_{2-4}$ diol used as the solvent may be the same as those used as the primary and/or secondary alcohols, etc., forming the protective layer. Due to the use of the same $C_{2-4}$ diol as the primary and/or secondary alcohols, etc., forming the protective layer as the solvent, a part of the solvent forms the protective layer of the copper nanoparticles; thus, there is no need to separately add primary and/or secondary alcohols, etc., for forming the protective layer, in addition to the solvent. Accordingly, copper nanoparticles can be easily produced. Examples of the same $C_{2-4}$ diol as the primary and/or secondary alcohols, etc., forming the protective layer include 1,2-propanediol.

As the solvent used in step I, a $C_2$-4 diol may be singly used; however, another polar solvent (e.g., dimethylformamide, N-methylpyrrolidone, or ethylene glycol monomethyl ether) may be used in combination. When two or more solvents are mixed, the content of $C_{2-4}$ diol in the solvent mixture is preferably 60 wt. % or more, and more preferably 90 wt. % or more.

The above solution may contain other additives in addition to copper acetate, $C_{3-6}$ primary and/or secondary alcohols etc., and a $C_{2-4}$ diol. Examples of other additives include an ethanol solution of ammonia. The ammonia content of the ethanol solution is preferably 1 to 5 vol % based on 100 vol % of the ethanol solution.

By step I described above, a solution in which copper acetate and $C_{3-6}$ primary and/or secondary alcohols etc., are dissolved in a $C_{2-4}$ diol is prepared.

Step II is to reduce the solution prepared by step I with hydrazine under atmospheric pressure at 100° C. or less. Examples of a reducing agent used in the hydrazine reduction include hydrazine compounds. Among them, hydrazine, hydrazine sulfate, and phenylhydrazine can be suitably used. On the other hand, sodium boron hydride is known as a reducing agent used in the synthesis of metal nanoparticles having an average particle diameter of 6 nm or less. If sodium boron hydride is used as the reducing agent in step II, the produced copper nanoparticles are aggregated, and bulk copper is precipitated.

The concentration of the hydrazine compound in the solution in step II is preferably 5 to 30 times, and more preferably 15 to 30 times, higher than the concentration of copper ions in the solution. If the concentration of the hydrazine compound in the solution is too low, the ability to reduce the copper nanoparticles may be insufficient, and the average particle diameter of the copper nanoparticles may be larger. If the concentration of the hydrazine compound in the solution is too high, the amount of hydrazine compound may be excessive, thereby making it difficult to separate and purify the copper nanoparticles.

In step II, hydrazine reduction is carried out under atmospheric pressure. In step I, a solution in which copper acetate and $C_{3-6}$ primary and/or secondary alcohols, etc., are dissolved in a $C_2$-4 diol is prepared, and the resulting solution is reduced with hydrazine in step II. Thus, step II can be performed under atmospheric pressure. Therefore, according to the above production method, which does not require pressurization in the production process, copper nanoparticles can be easily produced.

In step II, hydrazine reduction is carried out at 100° C. or less. Specifically, step II may be performed after the temperature of the solution prepared in step I is adjusted to 100° C. or less. The temperature of hydrazine reduction is preferably 100° C. or less, and more preferably 50° C. or less. If the temperature of hydrazine reduction is too high, by-products may be produced. Moreover, in step II, the temperature of hydrazine reduction is preferably 5° C. or more, and more preferably 20° C. or more. If the temperature of hydrazine reduction is too low, copper nanoparticles may not be sufficiently produced.

By step II described above, the solution prepared in step I is reduced with hydrazine under atmospheric pressure.

The method for producing copper nanoparticles described above can produce copper nanoparticles each having a central portion comprising a copper single crystal, and a protective layer surrounding the central portion. According to the production method, copper nanoparticles having an average particle diameter as small as about 10 nm or less, particularly about 3 to 6 nm, can be obtained. Moreover, the protective layer contains $C_{3-6}$ primary and/or secondary alcohols, etc., and is therefore volatile. Further, since the boiling point or thermal decomposition point of the protective layer can be 150° C. or less, the protective layer can be removed by heating at 150° C. or less, and the copper nanoparticles can be sintered at a low temperature of 150° C. or less. Furthermore, in the above production method, the copper nanoparticles are obtained in a state where they are uniformly dispersed in the above solution. Therefore, the solution in which the obtained copper nanoparticles are dispersed can be used for the desired purpose.

According to the above production method, copper nanoparticles are obtained in a state where they are dispersed in the solution. The production method may further comprise, after step II, a step of precipitating the copper nanoparticles in the solution. Because the production method comprises this step, the precipitated copper nanoparticles can be collected and used. The method for precipitating the copper nanoparticles in the solution is not particularly limited, and a conventionally known method, such as precipitation by centrifugation, can be used. Another example of the method for precipitating the copper nanoparticles in the solution is a method for adding a precipitation solvent to the above solution to thereby precipitate the copper nanoparticles. The precipitation solvent is not particularly limited, as long as it can precipitate the copper nanoparticles. Examples thereof include dimethylacetamide (DMA), N-methylpyrrolidone (NMP), and the like. The use of such a precipitation solvent enables the precipitation of the copper nanoparticles in the solution, and the dissolution of hydrazine and $C_{3-6}$ primary and/or secondary alcohols, etc., which are impurities in the solution; therefore, the copper nanoparticles can be easily separated from the hydrazine and the $C_{3-6}$ primary and/or secondary alcohols, etc.

As the step of precipitating the copper nanoparticles in the above solution, the method for adding a precipitation solvent to the solution to thereby precipitate the copper nanoparticles may be followed by a method for precipitating the copper nanoparticles by centrifugation. When the copper nanoparticles in the solution are precipitated in the above manner, the copper nanoparticles can be more efficiently precipitated, and the copper nanoparticles can be easily separated.

The above production method may further comprise a step of washing the precipitated copper nanoparticles with a volatile solvent. Because the production method comprises this step, hydrazine and excess $C_{3-6}$ primary and/or secondary alcohols, etc., other than the protective layer, can be removed from the surface of the copper nanoparticles, and high-purity copper nanoparticles can be obtained. The volatile solvent can be acetone; however, dimethylacetamide or N-methylpyrrolidone is preferred because they can suppress the oxidation of the copper nanoparticles.

2. Method for Preserving Copper Nanoparticles

The method for preserving the copper nanoparticles of the present invention comprises:

(1) step 1 of precipitating the copper nanoparticles dispersed in a solution; and (2) step 2 of adding a $C_{4-14}$ alkane solvent to the solution in which the copper nanoparticles are precipitated.

According to this preservation method, the copper nanoparticles of the present invention can be stably preserved at room temperature for a long period of time, and can be transported.

Step 1 is to precipitate the copper nanoparticles dispersed in the solution. Because the copper nanoparticles are precipitated in the bottom of the solution by step 1, the copper nanoparticles can be kept away from the liquid surface of the solution, and the contact between the copper nanoparticles and oxygen can thereby be suppressed.

The method for precipitating the copper nanoparticles in the solution is not particularly limited. Examples of the method include a method for adding a precipitation solvent to the solution to thereby precipitate the copper nanoparticles, as described above in the "Method for producing copper nanoparticles" section. The precipitation solvent can be the same as those described in the above production method.

Step 2 is to add a $C_{4-14}$ alkane solvent to the solution in which the copper nanoparticles are precipitated. Because a $C_{4-14}$ alkane solvent is added to the solution in which the copper nanoparticles are precipitated, the alkane solvent, which has a low specific gravity, comes to the surface and covers the liquid surface of the solution; therefore, the contact between the copper nanoparticles and oxygen can be suppressed. Thus, the copper nanoparticles are precipitated in the bottom of the solution in step 1, and kept away from the liquid surface of the solution; in addition, the copper nanoparticles can be stably preserved for a long period of time, and can be transported.

The $C_{4-14}$ alkane solvent is not particularly limited, as long as it is a liquid and can cover the liquid surface of the solution in which the copper nanoparticles are precipitated; however, hexane, heptane, octane, nonane, decane, or dodecane is preferred, and octane is more preferred, because they are stable at room temperature of 10° C. or more, and can stably preserve the copper nanoparticles at room temperature of 10° C. or more.

By the above preservation method, the copper nanoparticles can be stably preserved at room temperature for a long period of time, and can be transported.

The copper nanoparticles of the present invention can be dispersed in a dispersion medium to thereby form a copper nanoparticle dispersion (paste) in which the copper nanoparticles are redispersed as colloids. Such a copper nanoparticle dispersion is also one of the present inventions.

Examples of the dispersion medium include polar solvents, such as alcohols (e.g., methanol, ethanol, propylene glycol, and glycerol), toluene, alkanolamine, and N,N-dimethylformamide. These dispersion media may be used singly or as a mixture of two or more. For example, propylene glycol and glycerol may be used by mixing them at a volume ratio of 1:1. Among these, it is preferable to use alkanolamine, and more preferable to use $C_{3-6}$ alkanolamine, which has the same number of carbon atoms as the $C_{3-6}$ primary and/or secondary alcohols, etc., forming the protective layer of the copper nanoparticles, because it can maintain high dispersion stability. These dispersion media can be suitably selected, depending on, for example, the printing method whereby the copper nanoink is applied, the desired viscosity, and the type of copper circuit to be formed.

Further, the copper nanoparticles of the present invention can be mixed with copper particles and dispersed in a dispersion medium to thereby form a copper nanoparticle dispersion (paste) in which the copper nanoparticles and the copper particles are redispersed as colloids. Such a copper nanoparticle dispersion in which the copper nanoparticles and copper particles are dispersed in a dispersion medium is also one of the present inventions. The dispersion medium used in the copper nanoparticle dispersion can be the same as those mentioned above. The copper particles as mentioned in the present specification have an average particle diameter of 1 μm or more, and are differentiated from copper nanoparticles. Copper particles having an average particle diameter of 1 μm or more are inexpensive, and their use allows cost reduction; however, it is difficult to sinter them at a low temperature of 150° C. or less, and it is difficult to obtain a copper thin film showing a low electric resistance of $10^{-5}$ Ωcm. When the copper nanoparticles of the present invention are added as a low-temperature sintering aid to micro-order copper particles having an average particle diameter of 1 μm or more, a copper thin film having a low electric resistance of $10^{-5}$ Ωcm can be produced by low-temperature sintering at 150° C. or less.

The average particle diameter of the copper particles is preferably 1 to 200 μm, more preferably 1 to 100 μm, even more preferably 1 to 40 μm, and particularly preferably 1 to 5 μm. If the average particle diameter of the copper particles is too small, the copper particles are expensive, and the cost reduction due to the combined use of the copper particles may not be sufficient. If the average particle diameter of the copper particles is too large, the electric resistance of a circuit may not be sufficiently reduced when the circuit is formed using copper nanoink prepared by mixing the copper particles and copper nanoparticles.

In the copper nanoparticle dispersion, the ratio of the mass of the copper nanoparticles (Ma) to the total (Ma+Mb) of the mass of the copper nanoparticles (Ma) and the mass of the copper particles (Mb) is preferably 10 mass % or more, and more preferably 30 mass % or more. If the ratio of the mass of the copper nanoparticles (Ma) is too low, it is difficult to sinter the copper particles at a low temperature of 150° C. or less. Further, when a circuit is formed using copper nanoink prepared by mixing copper particles and copper nanoparticles, cracks are easily formed in the circuit, and the electric resistance of the circuit may not be sufficiently reduced. Moreover, in the copper nanoparticle dispersion, the ratio of the mass of the copper nanoparticles (Ma) to the total (Ma+Mb) of the mass of the copper nanoparticles (Ma) and the mass of the copper particles (Mb) is preferably 80 mass % or less, and more preferably 50 mass % or less. If the ratio of the mass of the copper nanoparticles (Ma) is too high, the effect of reducing the electric resistance of the circuit due to the combined use of the copper nanoparticles is saturated, and cost reduction may not be achieved.

The total (Ma+Mb) of the mass of the copper nanoparticles (Ma) and the mass of the copper particles (Mb) in the copper nanoparticle dispersion is preferably 10 to 80 mass %, and more preferably 30 to 50 mass %, based on 100 mass % of the copper nanoparticle dispersion.

The copper nanoparticle dispersion is used by incorporating it into copper nanoink. The copper nanoink comprising the copper nanoparticle dispersion is also one of the present inventions.

Further, the copper nanoparticles can be easily dispersed in a dispersion medium mentioned above by removing the supernatant alkane solvent and the solution in a preservation state of the copper nanoparticles by the method for preserving the copper nanoparticles mentioned above, that is, in a preservation state in which the $C_{4-14}$ alkane solvent covers the liquid surface of the solution in which the copper nanoparticles are precipitated in the bottom, and adding the dispersion medium to the remaining copper nanoparticles. Accordingly, the copper nanoparticles preserved by the method for preserving the copper nanoparticles of the present invention can be easily formed into a copper nanoparticle dispersion and copper nanoink.

In the copper nanoparticle dispersion and copper nanoink, it is not essential to completely remove the solvent or amine; a dispersion medium may be added while they are left to reach an optimal concentration, depending on the use. Further, the copper nanoink may suitably contain terpineol, dodecanol, ethylene glycol, 1-methoxy-2-propanol, etc., depending on the use.

The content of metal copper in the copper nanoink is preferably 5 wt % or more and less than 80 wt %, and more preferably 10 wt % or more and less than 70 wt %. If the metal copper content is too low, the copper nanoink may not be suitably used as conductive paste. In contrast, if the metal copper content is too high, the copper nanoink has a high viscosity and is difficult to handle.

The copper nanoparticles of the present invention can be preferably used as an ink material for forming a fine metal wire; however, the use of the copper nanoparticles is not limited thereto. The copper nanoparticles of the present invention can be used as a catalyst material (a catalyst or a catalyst support), and can also be used as a transparent conductive film or an antireflection coating material, which can be alternative to ITO.

Because of the above structure, the copper nanoparticles of the present invention can be sintered at a low temperature of 150° C. or less even under ordinary pressure. Under reduced pressure, they can be sintered at a still lower temperature (e.g., 80° C. or less). The sintering may be conducted in a non-reducing atmosphere. Such a method for sintering the copper nanoparticles at a temperature of 150° C. or less in a non-reducing atmosphere under ordinary pressure or reduced pressure is also one of the present inventions. Although the non-reducing atmosphere is not particularly limited, for example, nitrogen or argon can be used.

EXAMPLES

The present invention is described in detail below with reference to Examples and Comparative Examples. However, the present invention is not limited to the Examples.

The devices and samples used in the Examples and Comparative Examples are as follows.

Ultraviolet Visible Absorption (UV-Vis) Spectrum Measurement

The measurement was carried out using a JASCO V-670 by placing 2 ml of sample in a four-side quartz cell (optical path length: 1 cm). The sample used was an ethanol dispersion of copper nanoparticles obtained by operation 2 described later.

Transmission Electron Microscope (TEM)

The measurement was carried out using a JEOL JEM-2010F. The sample used was the ethanol dispersion of copper nanoparticles obtained by operation 2 described later.

Infrared Spectroscopy (IR) Measurement

The measurement was carried out using a JASCO F/IR-4200. The sample used was a dry powder of copper nanoparticles obtained by operation 1 described later.

Thermal Analysis (TG-DTA)

The measurement was carried out using a Rigaku Thermo plus EVO. The sample used was a dry powder of the copper nanoparticles obtained by operation 1 described later.

Powder X-Ray Diffraction (XRD) Measurement

The measurement was carried out using a Bruker D2 PHASER. The sample used was copper nanoparticle paste (copper content: 30 wt %) obtained by operation 4 described later, a copper thin film obtained by heat-sintering the copper nanoparticle paste in a nitrogen atmosphere at 150° C. for 1 hour, or a copper thin film obtained by heat-sintering the copper nanoparticle paste (30 wt %) under reduced pressure at 80° C. for 6 hours.

Electric Resistance Measurement by Four-Probe Method

The measurement was carried out using a Mitsubishi Chemical Analytech Loresta. The sample used was a copper thin film obtained by heat-sintering the copper nanoparticle paste (30 wt %) obtained by operation 4 described later in a nitrogen atmosphere at 150° C. for 1 hour.

Example 1 (Preparation of Copper Nanoparticles and Various Samples)

Copper acetate (II) (2.73 g) was dissolved in ethylene glycol (30 mL) to prepare a 0.3-M copper acetate solution. Further, 1-amino-2-propanol (11.6 mL) was dissolved in ethylene glycol (30 mL) to prepare a 3-M 1-amino-2-propanol solution. When the 1-amino-2-propanol solution was added to the copper acetate solution, the color of the solution was changed to deep blue along with complex formation. Hereinafter, this solution is referred to as the "raw material solution."

While stirring the raw material solution at 1,500 rpm, hydrazine (7.29 mL; about 15 times larger than the mole of copper) was added at atmospheric pressure (in an air atmosphere) at 25° C. A large amount of bubbles was generated from the raw material solution immediately after the addition of hydrazine, and the color of the solution instantly changed to reddish black. Subsequently, the resultant was allowed to stand in an air atmosphere for a day.

In the above reaction, the raw material solution was stirred at a stirring speed as quick as 1,500 rpm; therefore, monodisperse-sized copper nanoparticles were easily produced due to the progress of the uniform reduction reaction, and the aggregation of the produced particles was easily suppressed. As a result of the above reaction, copper nanoparticles (300 mM in terms of copper ions) dispersed in the solution were obtained (image on left in FIG. 1).

The separation and purification of the copper nanoparticles from the solution in which the copper nanoparticles were dispersed, and the preservation of the collected copper nanoparticles, were performed by the following operations.

Operation 1

Dimethylacetamide (DMA) was added to the solution obtained in Example 1, in which the copper nanoparticles were dispersed, so that the volume ratio of the solution, in which the copper nanoparticles were dispersed, and DMA was 1:2. The solution was suspended due to the aggregation of the copper nanoparticles. The suspended solution was centrifuged at 6,000 rpm for 10 minutes, thereby obtaining a solution in which a precipitation of the copper nanoparticles was precipitated (image on right in FIG. 1). After the solution was removed, the precipitate of the copper nanoparticles was collected and washed twice with ethyl acetate to thereby separate the copper nanoparticles. Thus, the copper nanoparticles were obtained.

Operation 2

Ethanol was added to the copper nanoparticles obtained by operation 1, and the copper nanoparticles were dispersed therein, thereby obtaining a copper nanoparticle dispersion (paste).

Operation 3

Octane was added to the solution obtained by operation 1, in which the copper nanoparticle precipitate was precipitated (image on right in FIG. 1). The resulting mixture was preserved at room temperature. This suppressed the oxidation of copper for one month or more, and allowed preservation at room temperature for a long period of time.

Operation 4

After the octane was removed from the copper nanoparticles preserved by operation 3, 1-amino-2-propanol was added, and the copper nanoparticles were redispersed by ultrasonic waves, thereby obtaining a dispersion (paste) of the copper nanoparticles. The copper content of the copper nanoparticle paste was able to be adjusted from about 5% to 80% by changing the amount of 1-amino-2-propanol added. Because the specific gravity of 1-amino-2-propanol was greater than that of octane, the dispersion (paste) of the copper nanoparticles could also be prepared by adding 1-amino-2-propanol without removing the octane.

Evaluation of the Properties of the Copper Nanoparticles Obtained in Example 1

Figure 2:
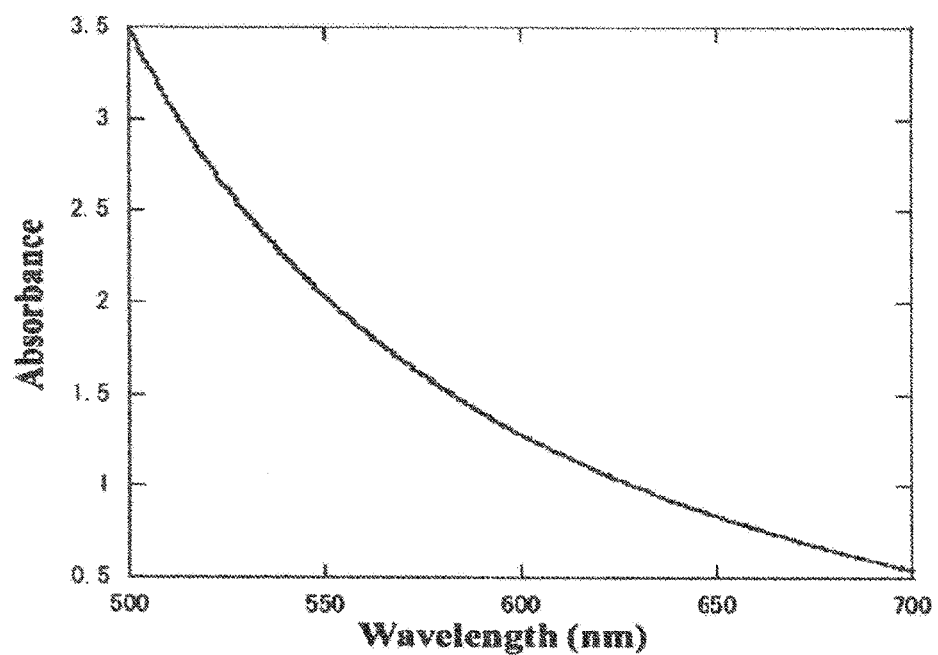
FIG. 2 shows the ultraviolet visible absorption spectrum of the copper nanoparticles obtained in Example 1.

FIG. 2 shows the ultraviolet visible absorption spectrum of the copper nanoparticles obtained by operation 1 of Example 1. The plasmon absorption of copper nanoparticles is generally observed in the region of 550 to 600 nm; however, no plasmon absorption is observed in copper nanoparticles of about 3 nm. In the copper nanoparticles obtained in Example 1, no plasmon absorption derived from the copper nanoparticles was observed. It was therefore found that copper nanoparticles of 3 nm or less were obtained.

Figure 3:
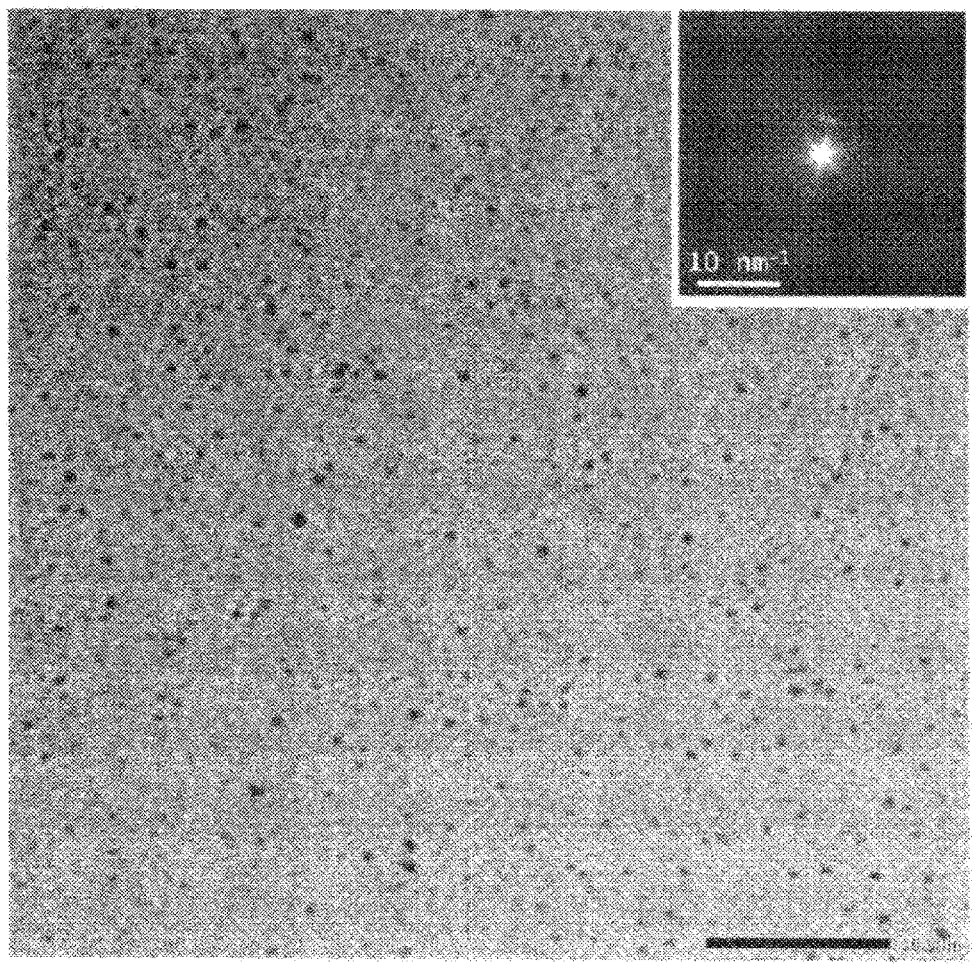
FIG. 3 shows a TEM observation image of the copper nanoparticles obtained in Example 1.
Figure 4:
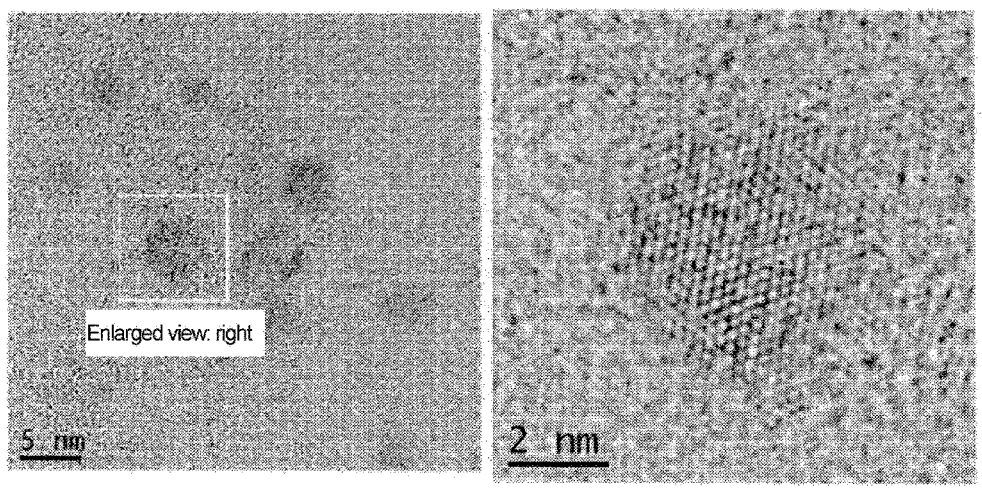
FIG. 4 shows a high-resolution TEM observation image (image on left) and electron diffraction image (image on right) of the copper nanoparticles obtained in Example 1.

FIG. 3 shows a TEM observation image of the copper nanoparticles. A sample obtained by redispersing the copper nanoparticles in ethanol showed high dispersion stability. The TEM observation image of FIG. 3 indicates that single nano-sized monodisperse copper nanoparticles were obtained. Regarding the particle size distribution of the copper nanoparticles, the average particle diameter is 3.5±1.0 nm. According to the high-resolution TEM observation image of FIG. 4 (image on right), a lattice pattern of copper was observed, and a diffraction ring from the copper 111 crystal plane was confirmed in the electron diffraction image.

Figure 5:
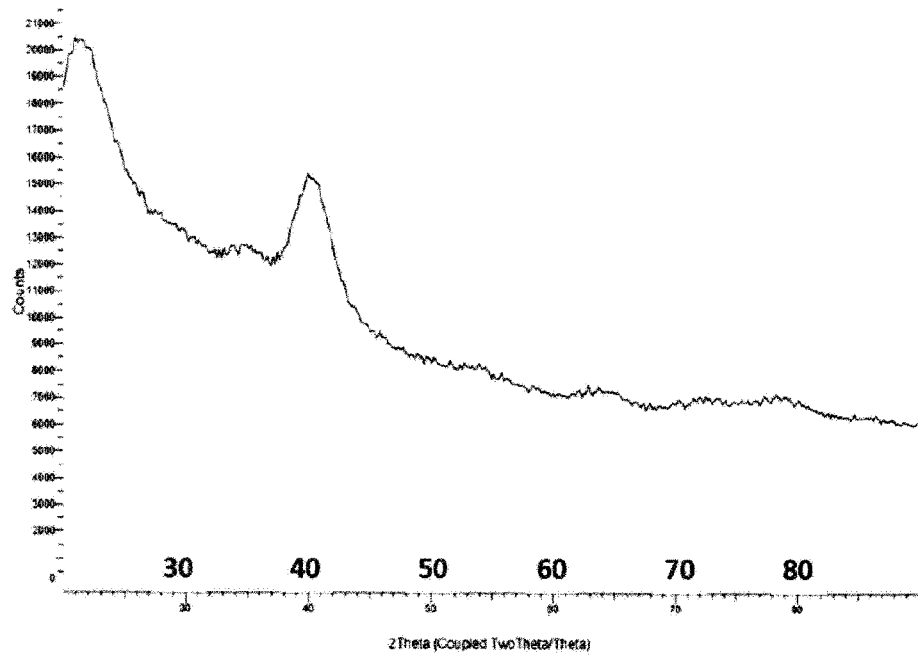
FIG. 5 shows the X-ray diffraction (XRD) measurement results of the copper nanoparticles obtained in Example 1.

FIG. 5 shows the XRD spectrum of the copper nanoparticles. A peak derived from the copper (111) plane was observed, while no peak derived from copper oxide was observed. This indicated that the resulting copper nanoparticles had oxidation resistance. It was estimated from the XRD spectrum that the particle size was about 3 nm, which was the same as the size evaluated by TEM observation. It was thereby found that the obtained copper nanoparticles were a copper single crystal.

Figure 6:
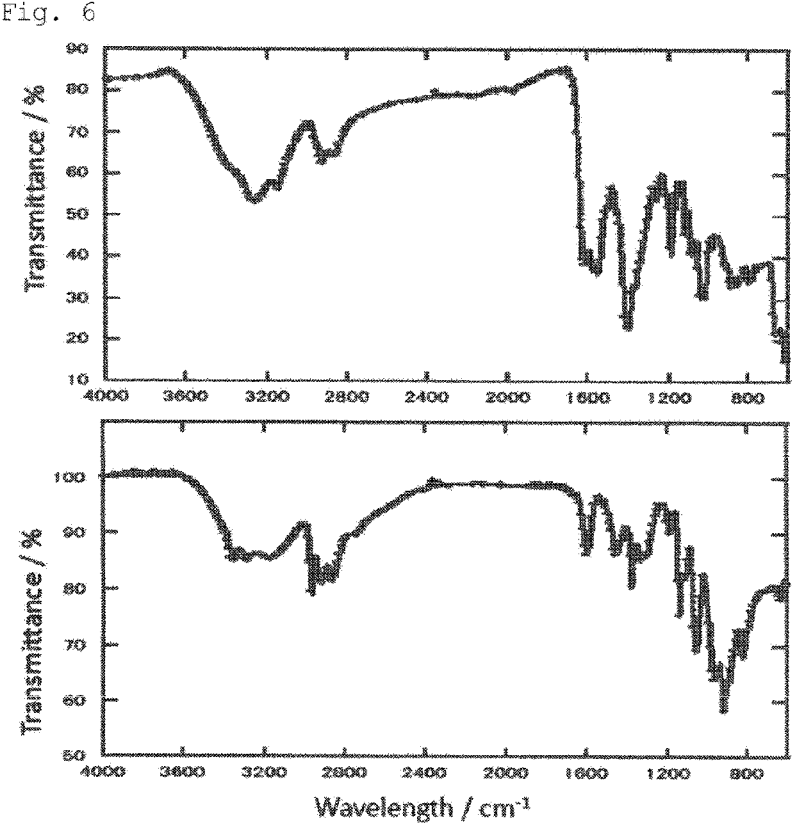
FIG. 6 shows the infrared spectroscopy (FT-IR) measurement results of the copper nanoparticles obtained in Example 1 (upper graph). For comparison, the lower graph shows the FT-IR measurement results of 1-amino-2-propanol.

In order to examine the reasons for the high dispersion stability and oxidation resistance of the copper nanoparticles, the surface state of the copper nanoparticles was examined by infrared spectroscopy measurement. The upper graph of FIG. 6 shows the results of the infrared spectroscopy measurement. For comparison, the lower graph of FIG. 6 shows infrared spectroscopy measurement results obtained by only measuring 1-amino-2-propanol. From the results of FIG. 6, absorption of hydroxyl was observed in the region of 3,500 to 3,000 $cm^1$, and absorption of methyl and ethyl was observed in the region of 3,000 to 2,800 $cm^{-1}$. Since the infrared absorption spectrum of the copper nanoparticles was the same as that of 1-amino-2-propanol, it was demonstrated that in the copper nanoparticles produced in Example 1, the 1-amino-2-propanol molecule was present as a surface protective layer. The copper nanoparticles obtained in Example 1 are considered to have high dispersion stability and high oxidation resistance because the 1-amino-2-propanol molecule is absorbed to the surface of the copper nanoparticles.

Figure 7:
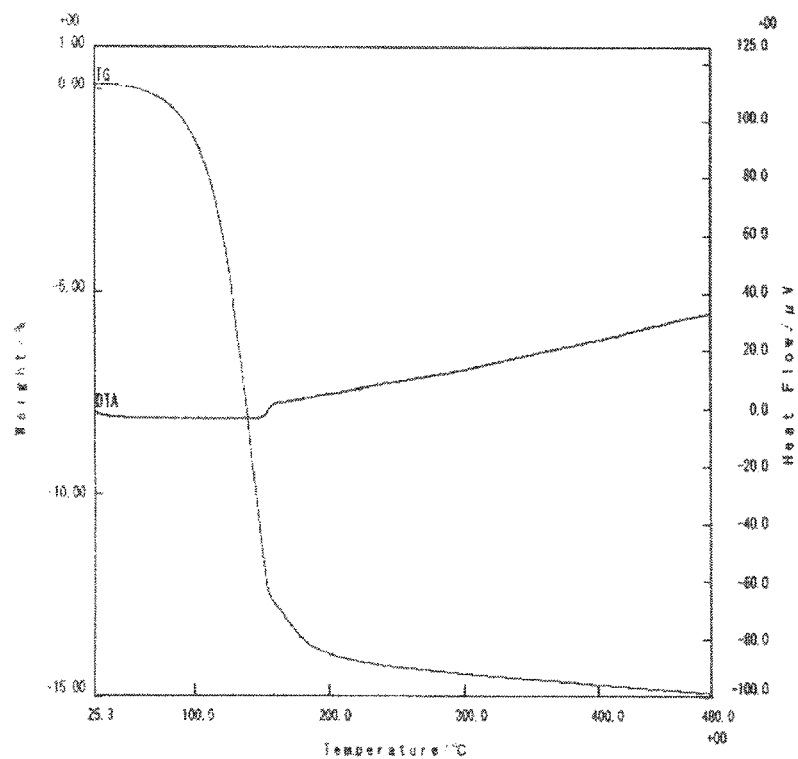
FIG. 7 shows the thermal analysis (TG-DTA) of the copper nanoparticles obtained in Example 1.

FIG. 7 shows the thermal analysis results (TG-DTA) of the copper nanoparticles. Weight loss started at around 80° C., and rapid weight loss resulting from the removal and evaporation of the 1-amino-2-propanol molecule was observed between 100° C. to 150° C. It was thereby found that the 1-amino-2-propanol molecule forming the protective layer of the surface of the copper nanoparticles could be removed at a low temperature of 150° C. or less.

Figure 8:
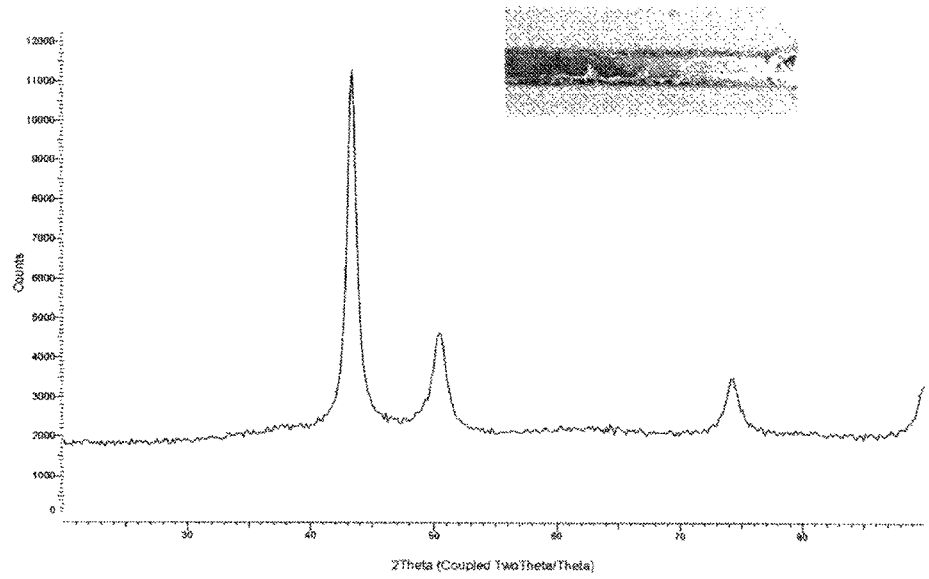
FIG. 8 shows the X-ray diffraction (XRD) measurement results of paste in which the copper nanoparticles obtained in Example 1 are dispersed, after low-temperature sintering at 150° C. in a nitrogen atmosphere.

Copper nanoparticles have a small particle size, and are considered to have a lower melting point than bulk copper. The copper nanoparticle paste (copper content: about 30 wt %) obtained by operation 4 was heated on polyethylene terephthalate (PET) in a nitrogen atmosphere at a low temperature of about 150° C. for 1 hour. As a result, the copper nanoparticles were sintered to lead to grain growth, and a copper thin film with metallic luster was formed. The electric resistance of the copper thin film was about $10^{-4}$ Ωcm. FIG. 8 shows the XRD spectrum of the copper thin film obtained after heating at a low temperature of about 150° C. in a nitrogen atmosphere. Compared with the copper nanoparticles before low-temperature sintering (FIG. 5), the diffraction peak intensity increased due to grain growth by sintering, and a sharp peak was observed. Moreover, that the copper thin film after low-temperature sintering was not oxidized was confirmed from the fact that no peak of copper oxide was observed in the XRD spectrum.

Figure 9:
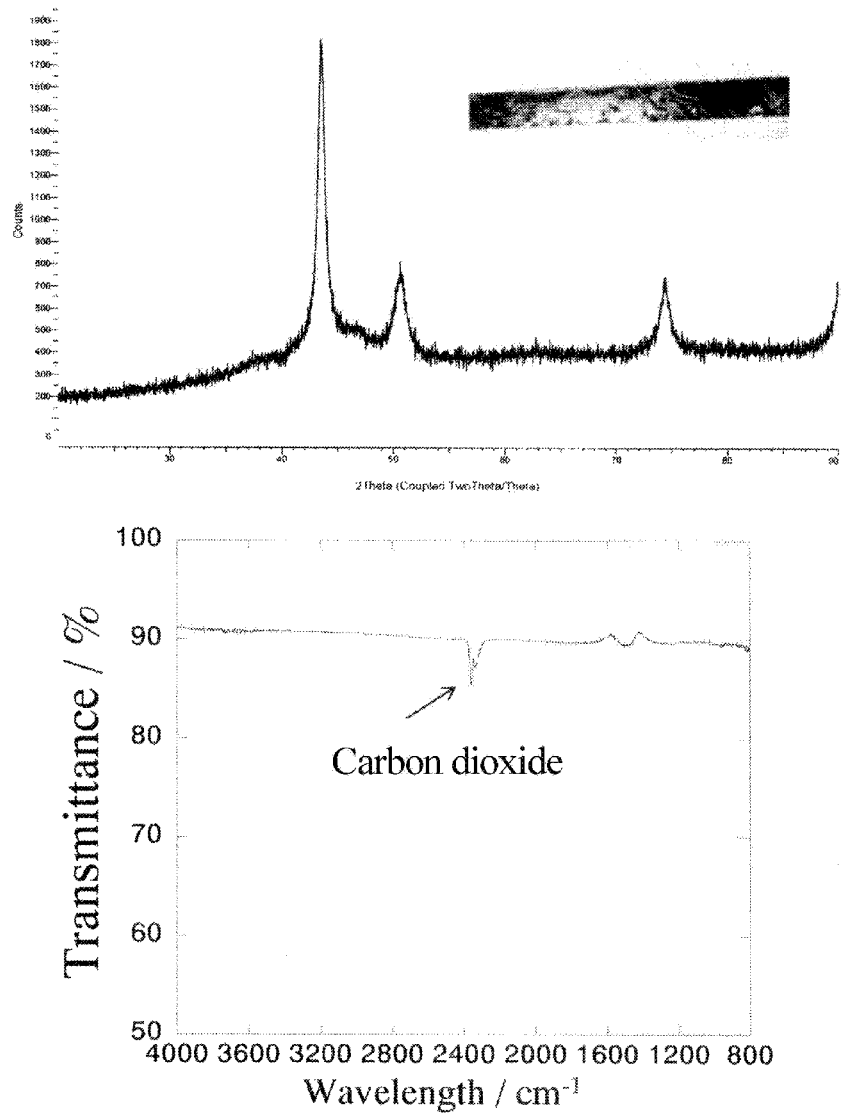
FIG. 9 shows the X-ray diffraction (XRD) measurement results (upper graph) and infrared spectroscopy (FT-IR) measurement results (lower graph) of paste in which the copper nanoparticles obtained in Example 1 are dispersed, after low-temperature sintering at 80° C. under reduced pressure.

It was revealed that the copper nanoparticle paste underwent low-temperature sintering even at about 80° C. When the copper nanoparticle paste (copper content: about 30 wt %) was heated on a PET substrate under reduced pressure at a low temperature of about 80° C., a copper thin film with metallic luster was formed. The upper graph of FIG. 9 shows the XRD spectrum of a copper thin film obtained after low-temperature heating at about 80° C. for 6 hours under reduced pressure. The XRD spectrum confirmed that the size growth due to low-temperature sintering and a peak of copper oxide were not observed. The infrared spectroscopy measurement results of the copper nanoparticles after low-temperature sintering at 80° C. (lower graph of FIG. 9) confirmed that the absorption of the 1-amino-2-propanol molecule absorbed to the surface of the copper nanoparticles observed before low-temperature sintering (upper graph of FIG. 6) disappeared under reduced pressure. It is considered that the 1-amino-2-propanol molecule, which has a boiling point of 160° C., was evaporated and eliminated due to its volatility, and that sintering of the copper nanoparticles thus occurred even at 80° C., which was lower than the boiling point.

Figure 10:
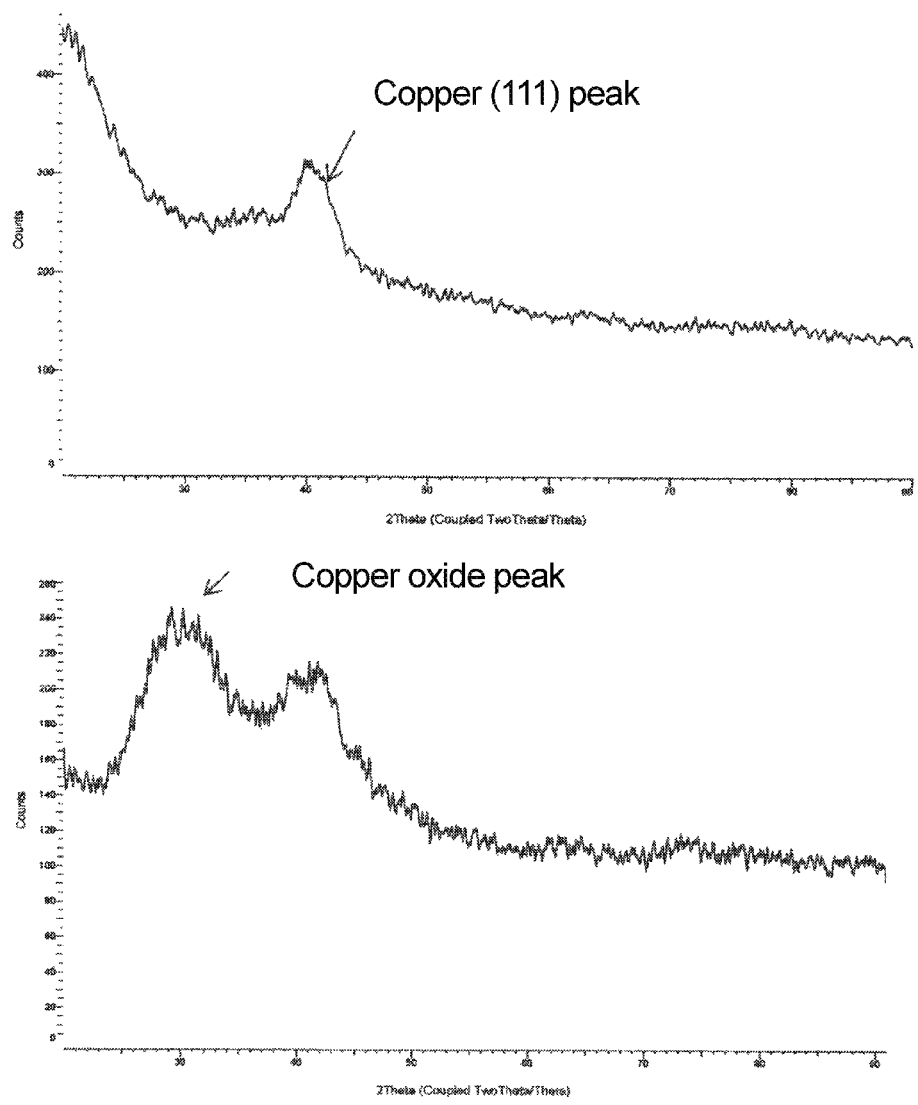
FIG. 10 shows the X-ray diffraction (XRD) measurement results of the copper nanoparticles obtained in Example 1 measured one month later after octane treatment (upper graph of FIG. 10). For comparison, the lower graph of FIG. 10 shows the XRD measurement results of the copper particles without octane treatment.

When the copper nanoparticles obtained by operation 3 were preserved in an air atmosphere at room temperature for one month, it was confirmed from the XRD spectrum (upper graph of FIG. 10) that the oxidation of copper was suppressed. In contrast, when copper particles (average particle diameter: 4 nm) that were not preserved using octane, were preserved in a dry state in an air atmosphere, oxidation was observed 3 days later (lower graph of FIG. 10).

Example 2 (Preparation of Copper Nanoparticles and Various Samples)

Copper acetate (II) (0.136 g), 2-hydroxybutyric acid (0.390 g), and an ethanol solution (5 mL) containing 4 vol % ammonia were dissolved in ethylene glycol (44 mL) to prepare a 0.015-M copper acetate solution. The color of the copper acetate solution was changed to deep blue along with complex formation. Hereinafter, this solution is referred to as the "raw material solution."

While stirring the raw material solution at 1,500 rpm, hydrazine (0.74 mL; about 30 times larger than the mole of copper) was added at atmospheric pressure (in an air atmosphere) at 25° C. A large amount of bubbles was generated from the raw material solution immediately after the addition of hydrazine, and the color of the solution instantly changed to reddish black. Subsequently, the resultant was allowed to stand in an air atmosphere for a day.

In the above reaction, the raw material solution was stirred at a stirring speed as quick as 1,500 rpm; therefore, monodisperse-sized copper nanoparticles were easily produced due to the progress of the uniform reduction reaction, and the aggregation of the produced particles was easily suppressed. As a result of the above reaction, copper nanoparticles dispersed in the solution were obtained. The separation and purification of the copper nanoparticles from the solution in which the copper nanoparticles were dispersed, and the preservation of the collected copper nanoparticles were performed by the following operations.

Operation 1

Dimethylsulfoxide (DMSO) was added to the solution obtained in Example 2, in which the copper nanoparticles were dispersed, so that the volume ratio of the solution, in which the copper nanoparticles were dispersed, and the DMSO was 1:3. The solution was suspended due to the aggregation of the copper nanoparticles. The suspended solution was centrifuged at 6,000 rpm for 10 minutes, thereby obtaining a solution in which a precipitate of the copper nanoparticles was precipitated.

Operation 2

Ethylene glycol was added to the copper nanoparticles obtained by operation 1, and the copper nanoparticles were dispersed therein, thereby obtaining a copper nanoparticle dispersion (paste).

Operation 3

Ethanol was added to the copper nanoparticles obtained by operation 1, and the copper nanoparticles were dispersed therein, thereby obtaining a copper nanoparticle dispersion (paste).

Evaluation of the Properties of the Copper Nanoparticles Obtained in Example 2

Figure 11:
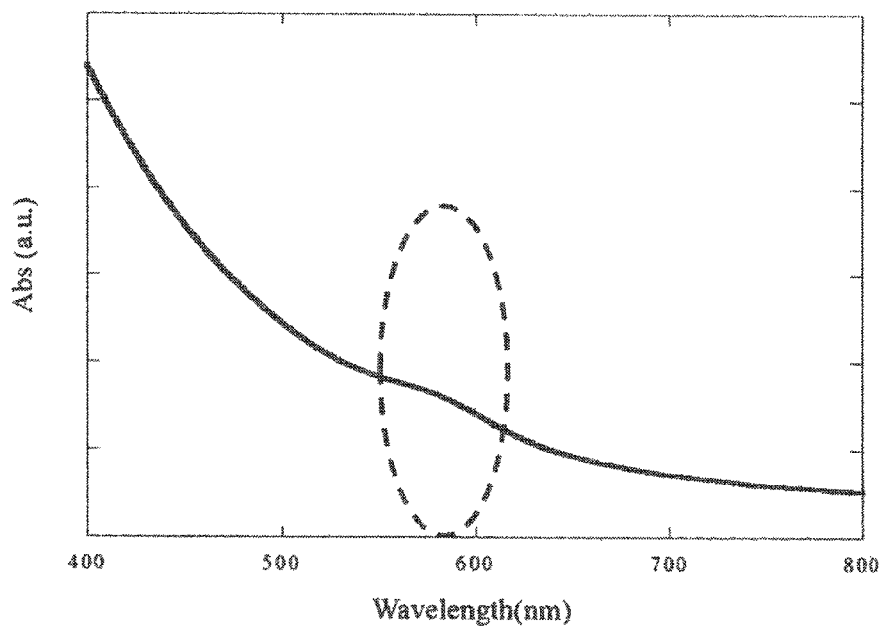
FIG. 11 shows the ultraviolet visible absorption spectrum of copper nanoparticles obtained in Example 2.

FIG. 11 shows the ultraviolet visible absorption spectrum of the copper nanoparticles obtained by operation 2 of Example 2. The plasmon absorption of copper nanoparticles of about 4 nm or more is generally observed in a region of 550 to 600 nm. When the surface of copper nanoparticles of about 4 nm or more is oxidized, no plasmon absorption is observed. Accordingly, plasmon absorption is used as an indicator of oxidation of copper nanoparticles. In the copper nanoparticles obtained in Example 2, plasmon absorption derived from the copper nanoparticles was observed. It was therefore found that copper nanoparticles were obtained.

Figure 12:
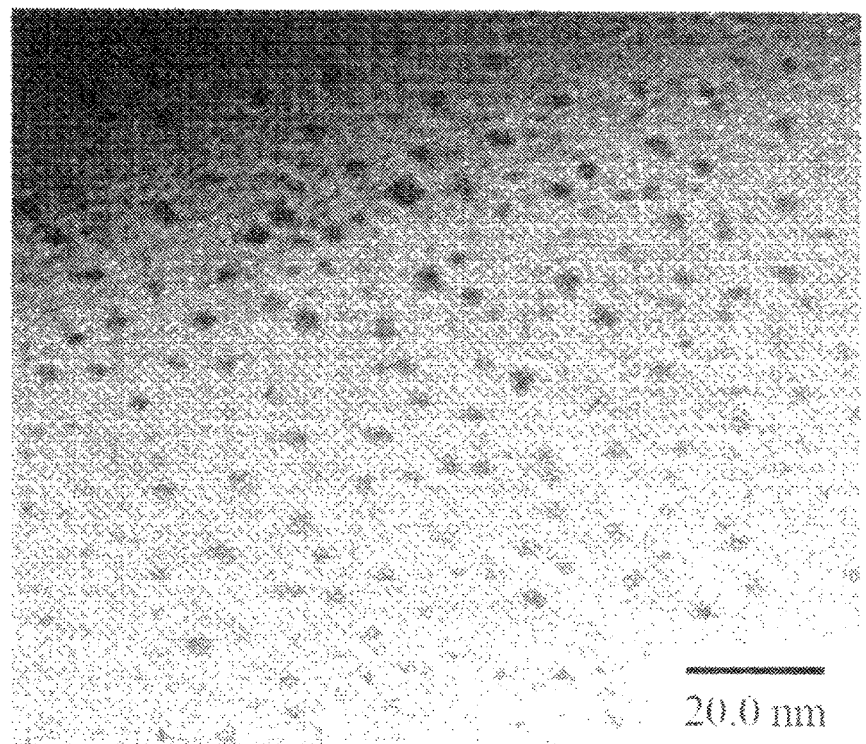
FIG. 12 shows a high-resolution TEM observation image of the copper nanoparticles obtained in Example 2.

FIG. 12 shows a TEM observation image of the copper nanoparticles obtained by operation 3 of Example 2. A sample obtained by redispersing the copper nanoparticles in ethanol had high dispersion stability. The TEM observation image of FIG. 12 indicates that single nano-sized (about 3 to 6 nm) monodisperse copper nanoparticles were obtained. Regarding the particle size distribution of the copper nanoparticles, the average particle diameter was 4.3±0.8 nm.

Figure 13:
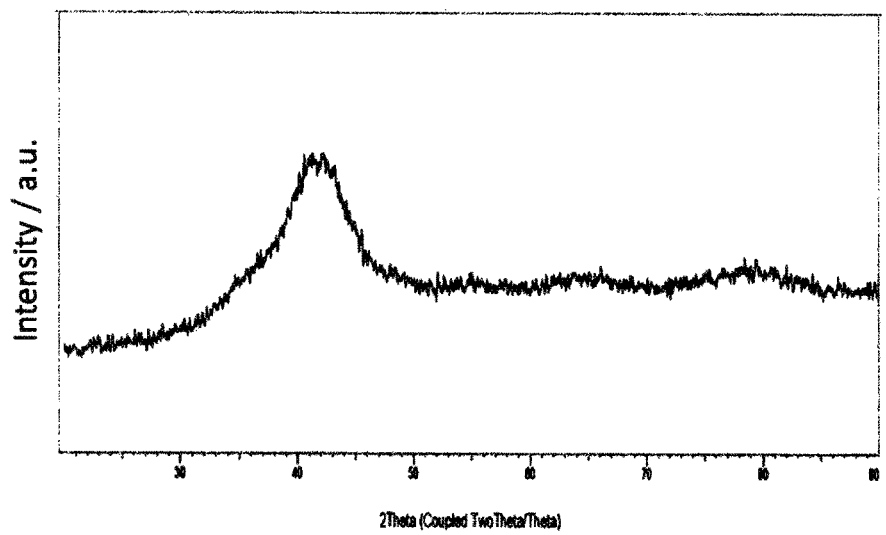
FIG. 13 shows the X-ray diffraction (XRD) measurement results of the copper nanoparticles obtained in Example 2.

FIG. 13 shows the XRD spectrum of the copper nanoparticles. A peak derived from the copper (111) plane was observed, and no peak derived from copper oxide was observed. This demonstrated that copper nanoparticles having oxidation resistance were obtained. It was estimated from the XRD spectrum that the particle size was about 4 nm, which was the same as the size evaluated by TEM observation. It was thereby found that the obtained copper nanoparticles were a copper single crystal.

Figure 14:
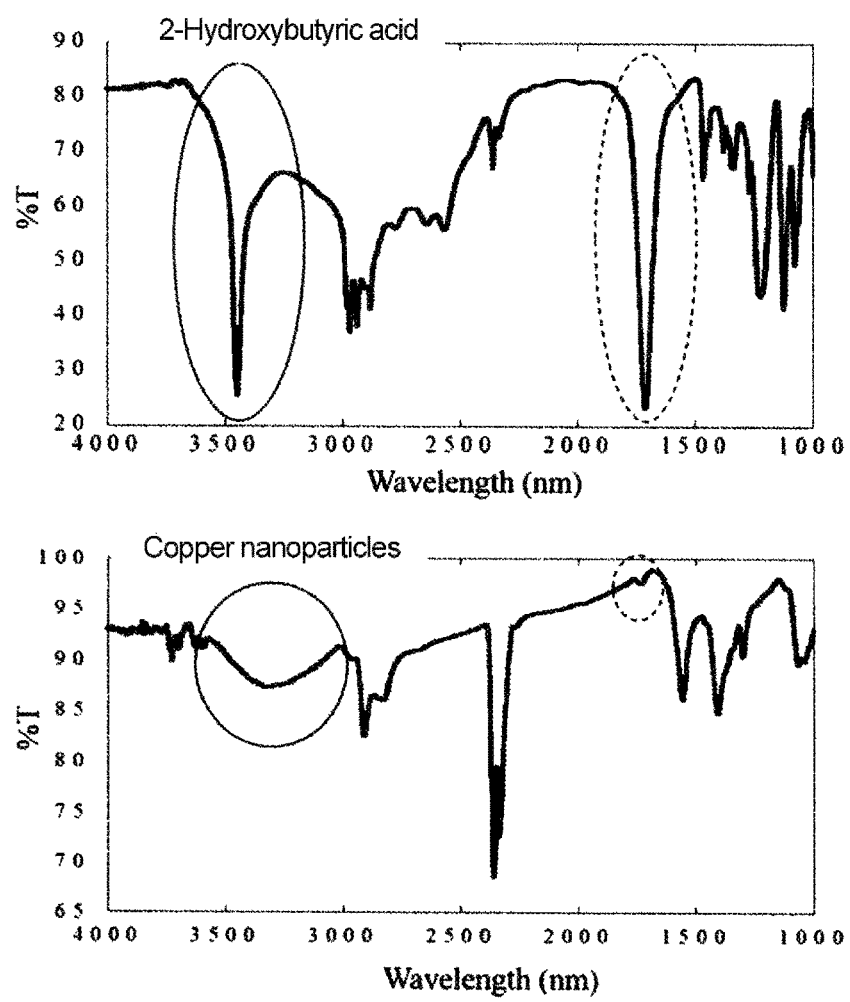
FIG. 14 shows the infrared spectroscopy (FT-IR) measurement results of the copper nanoparticles obtained in Example 2 (lower graph). For comparison, the upper graph shows the FT-IR measurement results of 2-hydroxybutyric acid.

In order to examine the reasons for the high dispersion stability and oxidation resistance of the copper nanoparticles, the surface state of the copper nanoparticles was examined by infrared spectroscopy measurement. The lower graph of FIG. 14 shows the results of the infrared spectroscopy measurement. For comparison, the upper graph of FIG. 14 shows infrared spectroscopy measurement results obtained by only measuring 2-hydroxybutyric acid. From the results of FIG. 14, absorption of hydroxyl was observed in the region of 3,500 to 3,000 $cm^{-1}$, and absorption of methyl and ethyl was observed in the region of 3,000 to 2,800 $cm^{-1}$. The infrared absorption spectrum of the copper nanoparticles was the same as that of 2-hydroxybutyric acid. It was thus demonstrated that in the copper nanoparticles produced in Example 2, the 2-hydroxybutyric acid molecule was present as a surface protective layer. In particular, absorption at 3,500 to 3,000 $cm^{-1}$ associated with the hydroxyl group of the secondary alcohol moiety was broadened; therefore, the copper nanoparticles obtained in Example 2 are considered to have high dispersion stability and high oxidation resistance because the 2-hydroxybutyric acid molecule is absorbed to the surface of the copper nanoparticles.

Comparative Example 1 (Difference in Copper Raw Material)

Copper nanoparticles were prepared in the same manner as in Example 1, except that copper formate was used in place of copper acetate as the copper raw material. The sample synthesized in Example 1 produced a reddish-brown copper nanoparticle dispersion with high dispersibility, whereas the copper nanoparticles of Comparative Example 1, which were synthesized using copper formate in place of copper acetate, were aggregated to reach an average particle diameter of greater than 10 nm, and were suspended, and the color of the solution was dark brown. In Comparative Example 1, the dispersibility of the copper nanoparticles in the solution was low.

Comparative Example 2 (Difference in Reaction Solvent)

Copper nanoparticles were prepared in the same manner as in Example 1, except that the solvent was replaced by ethanol. In Comparative Example 2, the copper nanoparticles were aggregated to reach an average particle diameter of greater than 10 nm immediately after a hydrazine reducing agent was added, and were suspended. In Comparative Example 2, the dispersibility of the copper nanoparticles in the solution was low.

Comparative Examples 3 and 4

Difference in Protective Agent

Copper nanoparticles were prepared in the same manner as in Example 1, except that monoethanolamine (Comparative Example 3) or octylamine (Comparative Example 4) was used in placed of 1-amino-2-propanol. In both Comparative Examples 3 and 4, the copper nanoparticles were aggregated to reach an average particle diameter of greater than 10 nm and were suspended. In Comparative Examples 3 and 4, the dispersibility of the copper nanoparticles in the solution was low.

Comparative Example 5 (Difference in Reducing Agent)

Copper nanoparticles were prepared in the same manner as in Example 1, except that the reducing agent was replaced by sodium boron hydride. In Comparative Example 5, the copper nanoparticles were aggregated to reach an average particle diameter of greater than 10 nm immediately after reduction, and were suspended. In Comparative Example 5, the dispersibility of the copper nanoparticles in the solution was low.

Examples 3 to 12

Preparation of Copper Nanoparticles and Copper Particle-Containing Copper Nanoparticle Dispersion (Preparation of Copper Nanoparticles)

As in Example 1, hydrazine was added to the raw material solution, and the mixture was allowed to stand in an air atmosphere for 24 hours, thereby preparing a dispersion in which copper nanoparticles were dispersed. Further, N,N-dimethylacetamide (hereinafter also referred to as "DMA") at a volume ratio two times larger than the dispersion was separately prepared. The amount of DMA was 25 ml. 24 hours after the addition of hydrazine, 12.5 ml of copper nanoparticle dispersion was slowly added dropwise to the prepared DMA so that drops were visible, thereby preparing a mixed solution. Due to the DMA, the excessive hydrazine, isopropanolamine, and ethylene glycol were removed. The mixed solution was allowed to stand in the air for several minutes and exposed to the air. As a result of this operation, the mixed solution began to be suspended and turned into a state in which the particles could be collected by centrifugation.

The suspended mixed solution was centrifuged at 6,000 rpm for 2 minutes, thereby obtaining a solution in which a precipitate of the copper nanoparticles was precipitated. After the transparent supernatant was removed from the solution, the copper nanoparticle precipitate was collected, and 7 ml of DMA was added. Subsequently, the copper nanoparticle precipitate was dispersed in DMA using a vortex mixer, and washing was performed again.

Immediately after it was confirmed that the copper nanoparticle precipitate was dispersed in the EVA, centrifugation was conducted at 6,000 rpm for 3 minutes. As a result of this operation, the resultant was separated into an almost transparent supernatant and the copper nanoparticle precipitate. The supernatant was removed, and 10 ml of toluene was added to the remaining precipitate. The precipitate was redispersed using a vortex mixer, and washing was performed. After it was confirmed that the precipitate of copper nanoparticles was dispersed in toluene, centrifugation was performed at 6,000 rpm for 1 minute to separate the copper nanoparticle precipitate. The transparent supernatant was removed, and 10 ml of hexane was added to the remaining precipitate. The precipitate was redispersed using a vortex mixer, and washing was performed. After it was confirmed that the copper nanoparticle precipitate was dispersed in hexane, centrifugation was conducted at 6,000 rpm for 5 minutes, the transparent supernatant was removed to separate the copper nanoparticle precipitate, and washing was completed. The average particle diameter of the obtained copper nanoparticles was 3 nm.

Examples 3 to 8

Preparation of Copper Nanoparticles and Copper Particle-Containing Copper Nanoparticle Dispersion The copper nanoparticles having an average particle diameter of 3 nm obtained by purification and separation by the above operation, and copper particles having an average particle diameter of 1 μm were mixed at the mixing ratio shown in Table 1 to prepare mixed particles. The mixing ratio (X) (mass %) in Table 1 is the ratio of the mass of the copper nanoparticles (Ma) to the total (Ma+Mb) of the mass of the copper nanoparticles (Ma) and the mass of the copper particles (Mb), which is represented by mass %. This value was calculated by the following formula:

$$(X)(\text{mass \%}) = [(Ma)/(Ma+Mb)] \times 100$$

A solvent obtained by mixing propylene glycol and glycerol at a volume ratio of 1:1 was added to the resulting mixed particles so that the copper content was 40 mass %. After the solvent was added, the hexane remaining in the mixed particles floating towards the upper layer of the solvent was removed. Further, the mixed particles and the solvent were mixed using a vortex mixer, and the hexane remaining in the mixed particles was separated and removed. Subsequently, vacuum drying was performed for 3 minutes to completely remove the hexane from the dispersion. As a result of the above operation, a copper nanoparticle dispersion in which the copper nanoparticles and the copper particles were dispersed in the dispersion medium was prepared. The dispersion was used as copper nanoink.

The copper nanoink obtained in the above manner was applied to a polyimide substrate by a bar coater to form a coating film. The coating film was dried at a nitrogen flow rate of 1 mL/min at 85° C. for one and a half hour, and heat-sintered at a nitrogen flow rate of 1 mL/min at 150° C. for 15 minutes to sinter the mixed particles, thereby forming a copper thin film.

Comparative Example 6

Copper nanoink was prepared in the same manner as in Examples 3 to 8, except that only copper particles having an average particle diameter of 1 μm were used, and copper nanoparticles were not mixed. The copper nanoink was used to form a copper thin film.

Figure 15:
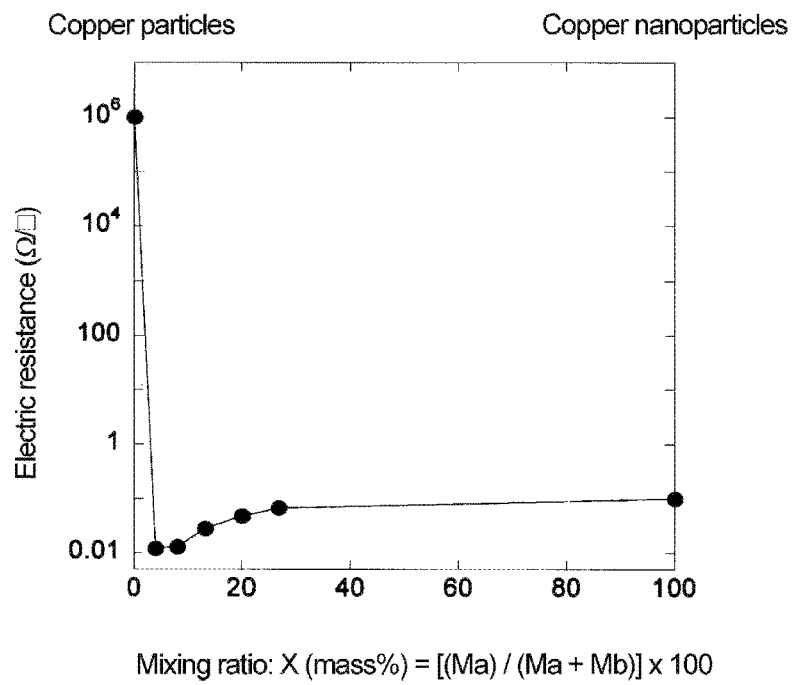
FIG. 15 shows the measurement results of the electric resistance of copper thin films prepared in Examples 3 to 8 and Comparative Example 6.

The electric resistance of the copper thin films prepared in Examples 3 to 8 and Comparative Example 6 was measured by a four-probe method using a Mitsubishi Chemical Analytech Loresta. Table 1 and FIG. 15 show the results.

TABLE 1

| | | Example 3 | Example 4 | Example 5 | Example 6 | Example 7 | Example 8 | Comparative Example 6 |
|---|---|---|---|---|---|---|---|---|
| Average particle diameter | Copper nanoparticles (nm) | 3 | 3 | 3 | 3 | 3 | 3 | — |
| | Copper particles (μm) | 1 | 1 | 1 | 1 | 1 | 1 | 1 |
| Mixing ratio (X) (mass %) | | 3.0 | 7.5 | 12.5 | 20.0 | 27.5 | 100 | 0 |
| Electric resistance (Ω/□) | | $1.2 \times 10^{-2}$ | $1.3 \times 10^{-2}$ | $2.8 \times 10^{-2}$ | $4.8 \times 10^{-2}$ | $6.8 \times 10^{-2}$ | $1.0 \times 10^{-1}$ | $1.0 \times 10^{6}$ |

Examples 9 to 12

Preparation of Copper Nanoparticles and Copper Particle-Containing Copper Nanoparticle Dispersion The ratio (mixing ratio (X)) of the mass of copper nanoparticles (Ma) having an average particle diameter of 3 nm to the total (Ma+Mb) of the mass of the copper nanoparticles (Ma) and the mass of copper particles (Mb) in the mixed particles was set to be 15 mass %. Further, the average particle diameter of the copper particles used was set as shown in Table 2. Copper nanoink was prepared in the same manner as in Examples 3 to 8 except for these conditions. The copper nanoink was used to form copper thin films.

Figure 16:
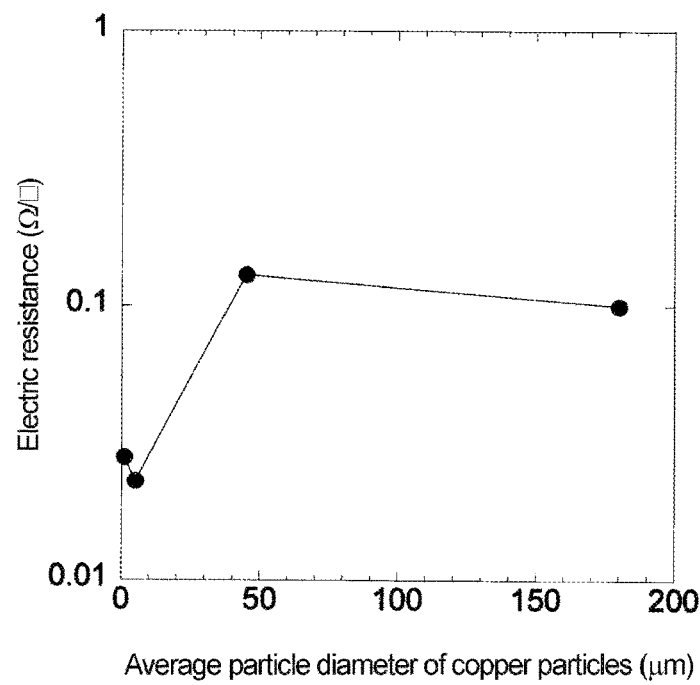
FIG. 16 shows the measurement results of the electric resistance of copper thin films prepared in Examples 9 to 12.

The electric resistance of the copper thin films prepared in Examples 9 to 12 was measured by a four-probe method using a Mitsubishi Chemical Analytech Loresta. Table 2 and FIG. 16 show the results.

TABLE 2

|  |  | Example 9 | Example 10 | Example 11 | Example 12 |
|---|---|---|---|---|---|
| Average particle diameter | Copper nanoparticles (nm) | 3 | 3 | 3 | 3 |
|  | Copper particles (μm) | 1 | 5 | 45 | 180 |
| Mixing ratio (X) (mass %) |  | 15.0 | 15.0 | 15.0 | 15.0 |
| Electric resistance (Ω/□) |  | $2.8 \times 10^{-2}$ | $2.3 \times 10^{-2}$ | $1.3 \times 10^{-3}$ | $1.0 \times 10^{-1}$ |

According to the results of Table 2, when the average particle diameter of copper particles was 5 μm or less, uniform copper thin films were formed, and their electric resistance was as low as $10^{-2}$ Ω/□ (Examples 9 and 10). In contrast, when the average particle diameter of copper particles was 45 μm or more, cracks were formed on the resulting copper thin films, and their electric resistance was $10^{-1}$ Ω/□ (Examples 11 and 12), which was higher than that when the average particle diameter was 5 μm or less. These results demonstrated that when copper particles having an average particle diameter of 5 μm or less were used in copper nanoink comprising a copper nanoparticle dispersion in which copper nanoparticles and copper particles were dispersed in a dispersion medium, the electric resistance of a copper thin film formed by using the copper nanoink could be particularly reduced.

The invention claimed is:

1. Copper nanoparticles each having a central portion comprising a copper single crystal, and a protective layer surrounding the central portion;
   (1) the copper nanoparticles having an average particle diameter of 10 nm or less;
   (2) the protective layer containing at least one member selected from the group consisting, of $C_{3-6}$ primary alcohols, $C_{3-6}$ secondary alcohols, and derivatives thereof; and
   (3) the protective layer having a boiling point or thermal decomposition point of 150° C. or less;
   wherein the at least one member selected from the group consisting of $C_{3-6}$ primary alcohols $C_{3-6}$ secondary alcohols, and derivatives thereof has a group represented by the following formula (1) or (2):

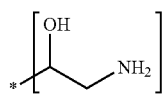

(1)

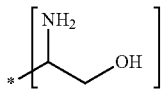

(2)

wherein in formulas (1) and (2), the asterisk (*) represents a bonding hand.

2. The copper nanoparticles according to claim 1, wherein the standard deviation based on particle size distribution is 20% or less of the average particle diameter of the copper nanoparticles.

3. The copper nanoparticles according to claim 2, wherein the mass ratio of the protective layer in each copper nanoparticle is 10 to 30 mass % based on 100 mass % of the copper nanoparticle.

4. A copper nanoparticle dispersion in which the copper nanoparticles according to claim 2 are dispersed in a dispersion medium.

5. A copper nanoparticle dispersion in which the copper nanoparticles according to claim 2 and copper particles are dispersed in a dispersion medium, wherein the copper particles have an average particle diameter of 1 μm or more.

6. The copper nanoparticles according to claim 1, wherein the mass ratio of the protective layer in each copper nanoparticle is 10 to 30 mass % based on 100 mass % of the copper nanoparticle.

7. A copper nanoparticle dispersion in which the copper nanoparticles according to claim 6 are dispersed in a dispersion medium.

8. A copper nanoparticle dispersion in which the copper nanoparticles according to claim 6 and copper particles are dispersed in a dispersion medium, wherein the copper particles have an average particle diameter of 1 μm or more.

9. A copper nanoparticle dispersion in which the copper nanoparticles according to claim 1 are dispersed in a dispersion medium.

10. Copper nanoink comprising the copper nanoparticle dispersion according to claim 9.

11. A copper nanoparticle dispersion in which the copper nanoparticles according to claim 1 and copper particles are dispersed in a dispersion medium, wherein the copper particles have an average particle diameter of 1 μm or more.

12. The copper nanoparticle dispersion according to claim 11, wherein the copper particles have an average particle diameter of 1 to 200 μm.

13. The copper nanoparticle dispersion according to claim 12, wherein the ratio of the mass of the copper nanoparticles (Ma) to the total (Ma+Mb) of the mass of the copper nanoparticles (Ma) and the mass of the copper particles (Mb) is 2 mass % or more.

14. The copper nanoparticle dispersion according to claim 11, wherein the ratio of the mass of the copper nanoparticles (Ma) to the total (Ma+Mb) of the mass of the copper nanoparticles (Ma) and the mass of the copper particles (Mb) is 2 mass % or more.

* * * * *